United States Patent [19]

Yoshida et al.

[11] Patent Number: 5,377,028

[45] Date of Patent: Dec. 27, 1994

[54] LIQUID CRYSTAL DISPLAY DEVICE WITH LIQUID CRYSTAL ELASTIC CONSTANT RATIO AT LEAST 1.75

[75] Inventors: Tetsushi Yoshida; Toshiomi Ono; Jiro Takei, all of Tokyo, Japan

[73] Assignee: Casio Computer Co., Ltd., Tokyo, Japan

[21] Appl. No.: 178,442

[22] Filed: Jan. 6, 1994

Related U.S. Application Data

[63] Continuation of Ser. No. 767,015, Sep. 27, 1991, abandoned.

[30] Foreign Application Priority Data

| Oct. 1, 1990 | [JP] | Japan | 2-263560 |
| Oct. 1, 1990 | [JP] | Japan | 2-263561 |
| Oct. 1, 1990 | [JP] | Japan | 2-263562 |
| Jul. 11, 1991 | [JP] | Japan | 3-196167 |
| Jul. 12, 1991 | [JP] | Japan | 3-197259 |

[51] Int. Cl.$^5$ .................. G02F 1/133; G02F 1/1335; G02F 1/13
[52] U.S. Cl. ........................... 359/53; 359/73; 359/102
[58] Field of Search .................. 359/73, 53, 102

[56] References Cited

U.S. PATENT DOCUMENTS

| 4,664,482 | 5/1987 | Kando et al. | 359/102 |
| 4,789,508 | 12/1988 | Vinet et al. | 359/102 |
| 4,844,569 | 7/1989 | Wada et al. | 359/102 |
| 4,909,605 | 3/1990 | Asano et al. | 359/15 |
| 4,944,577 | 7/1990 | Yoshida et al. | 359/102 |
| 4,974,940 | 12/1990 | Asano et al. | 359/102 |
| 5,048,933 | 9/1991 | Asano | 359/102 |
| 5,058,998 | 10/1991 | Yoshida et al. | 359/102 |
| 5,124,825 | 6/1992 | Asano et al. | 359/102 |

FOREIGN PATENT DOCUMENTS

| 0033522 | 2/1989 | Japan | 359/102 |
| 2080561 | 2/1982 | United Kingdom | 359/102 |

*Primary Examiner*—Anita Pellman Gross
*Attorney, Agent, or Firm*—Frishauf, Holtz, Goodman & Woodward

[57] ABSTRACT

A liquid crystal display device includes a pair of substrates facing each, first and second electrodes formed on each inner surface of the substrates and arranged so that they are crossed and face each other, first and second aligning films covering each inner surface of the substrates and said first and second electrodes and provided with an aligning treatment in a direction respectively, and a liquid crystal member sealed between the substrates by a seal layer. The liquid crystal layer is twistingly aligned by the aligning force of said first and second aligning films at an angle of approx. 230° to 250°, and has a positive dielectric anisotropy. The liquid crystal layer includes a liquid crystal member having a dielectric constant ratio $\Delta\epsilon/\epsilon\perp$ defined as a ratio of the dielectric anisotropy $\Delta\epsilon$ and the dielectric constant $\epsilon\perp$ with the direction orthogonal to the liquid crystal molecule axis of 2 or less, and a elastic constant ratio $K_{33}/K_{11}$ defined as a ratio of a bent elastic constant $K_{33}$ to a splay elastic constant $K_{11}$ of 1.75 or more.

13 Claims, 8 Drawing Sheets

LIQUID CRYSTAL DISPLAY DEVICE WITH LIQUID CRYSTAL ELASTIC CONSTANT RATIO AT LEAST 1.75

This application is a continuation of application Ser. No. 07/767,015, filed Sep. 27, 1991 now abandoned.

BACKGROUND OF THE INVENTION

1. Field of the Invention

The present invention relates to a field-effect-type liquid crystal display device to be time-division driven (multiplex-driven).

2. Description of the Related Art

A liquid crystal display device is widely used as a display device of office equipment. A liquid crystal display device with a large number of pixels and high display quality is requested according to enlargement of the display screen size. A liquid crystal display element consisting of a single matrix structure allowing the element structure and drive unit to be simplified is widely used for the office equipment.

The liquid crystal display element consisting of the single matrix structure has one substrate in which a signal electrode is formed like a stripe, another substrate in which a scanning electrode is formed like a stripe so that the signal and scanning electrodes cross each other, and a liquid crystal cell consisting of a twisted liquid crystal member sandwiched between both substrates. A pair of polarizing plates is installed outside the liquid crystal cell. The pixel formed on the portion where the scanning and signal electrodes are crossed is turned on/off by supplying a scanning signal to the scanning electrode and a data signal to the signal electrode synchronously with the scanning signal.

For the time-sharing driving method, a stroke is produced between turned-on and turned-off pixels. Therefore, if the number of time divisions for time-division driving is increased, the difference of the voltage applied to the turned-on and turned-off pixels or the operating margin decreases, the contrast is impaired, and the view angle narrows. The conventional TN-type liquid crystal display element only takes the number time divisions of up to the duty ratio of approx. 1/60 because it is inferior in the sharpness of brightness change for the applied voltage. Therefore, it is difficult to obtain a display device with a high quality and large size.

To improve the sharpness, STN-type and SBE-type liquid crystal display elements with a large twist angle are practically used. These liquid crystal display elements can take the number of divisions of up to the duty ratio of approx. 1/200 when the sharpness is improved by increasing the twist angle to 180° to 270°.

Therefore a liquid crystal display element with 640×400 dots uses the method in which a display screen is divided into upper and lower groups and each group is driven by the duty ratio of 1/200. The liquid crystal display element with upper and lower groups divides the signal electrode into upper and lower portions at its center. Therefore, the area of the pixel adjacent to the boundary between two divided portions changes depending on the substrate alignment accuracy and the line to divide the screen appears. In addition, because the signal electrode is divided into upper and lower portions, the number of driving circuits for supplying the data signal to the signal electrode requires two times as many as the number of signal electrodes. Also, the driving circuit of the scanning electrode for supplying the scanning signal to the scanning electrode requires complicated signal processing to execute scanning by dividing the scanning electrode into two groups. Therefore, there are disadvantages that the size of the display device increases because the driving circuit becomes complicated, the number of elements of the electronic circuit increases, and the device cost increases. Moreover, the above liquid crystal display element has disadvantages in view of the operation stability that the response time is too long because of a large twist angle and display irregularity occurs due to a long time operation.

SUMMARY OF THE INVENTION

The present invention is made to solve the above problems and it is an object of this invention to provide a liquid crystal display device having a high contrast and satisfactory sharpness of brightness change and realizing a high time-division driving.

It is another object of this invention to provide a liquid crystal display element which stably operates for a long time.

To achieve the above objects, the liquid crystal display element related to a first aspect of the present invention has a pair of substrates facing each other; first and second electrodes which are formed on the inner surfaces of these substrates with face each other and which are arranged so that the electrodes are crossed and face each other; first and second aligning films which cover the inner surfaces of these substrates and the first and second electrodes and which are provided with an aligning treatment in a certain direction; a liquid crystal layer which is sealed by a seal member between these substrates, twistingly aligned by the aligning control force of the first and second aligning films at the angle of approx. 230° to 250°, and has the dielectric constant ratio $\Delta\epsilon/\epsilon\perp$ (which is shown by a ratio of the dielectric anisotropy $\Delta\epsilon$ to the dielectric constant $\epsilon\perp$ in the direction orthogonal to the liquid crystal molecule axis) of 15 or less, the elastic constant ratio $K_{33}/K_{11}$ (which is shown by the ratio of a bent elastic constant $K_{33}$ to a splay elastic constant $K_{11}$) of 1.75 or more, and a positive dielectric anisotropy; and a pair of polarizing plates arranged at both sides of these substrates to sandwich the substrates therebetween.

Because the liquid crystal member used for the liquid crystal display device of the present invention has large twist angle of 230° to 250° and the dielectric constant ratio $\Delta\epsilon/\epsilon\perp$ of 1.5 or less, the dielectric constant of the liquid crystal layer has only a small change even if the aligning state of the liquid crystal molecules changes. Therefore, the sharpness of brightness change is improved because the field intensity applied to the liquid crystal layer only slightly changes. Moreover, because the elastic constant ratio $K_{33}/K_{11}$ of the liquid crystal member sealed between the facing substrates is 1.75 or more, the sharpness of brightness change is further improved. Thus, the liquid crystal display element of the present invention can be driven at a high time division and shows very high contrast.

The liquid crystal display element according to a second aspect of the present invention has a pair of substrates facing each other; first and second electrodes which are formed on the inner surfaces of these substrates which face each other and which are arranged so that the electrodes are crossed and face each other; first and second aligning films which cover the inner surfaces of these substrates and the first and second electrodes formed on their inner surfaces, are and which made of a macromolecule film for arranging adjacent liquid crystal molecules at a pre-tilt angle of 6° or more from the aligning film surface, and which are provided with an aligning treatment in a certain direction; a liquid crystal layer made of a liquid crystal member which is sealed by a seal member between these substrates and in which the liquid crystal molecules adjacent to the aligning films are arranged by the aligning force of the first and second aligning films at the pre-tilt angle of 6° or more from the aligning film surface, twistingly aligned at the angle of approx. 230° to 250° from the first aligning film toward the second aligning film, and has the dielectric constant ratio $\Delta\epsilon/\epsilon\perp$ (which is defined by a ratio of the dielectric anisotropy $\Delta\epsilon$ to the dielectric constant $\epsilon\perp$ in a direction orthogonal to a liquid crystal molecule axis) of 1.5 or less and a positive dielectric anisotropy; and a pair of polarizing plates arranged at both sides of these substrates to sandwich the substrates therebetween.

For the liquid crystal display element, because the twist angle of the liquid crystal molecule of the liquid crystal layer is increased to 230°-250° and the pre-tilt angle of the liquid crystal molecule adjacent to the aligning film of the liquid crystal layer is set to 6° or more, a stable and homogenous aligning state can be obtained even if the dielectric constant ratio $\Delta\epsilon/\epsilon\perp$ is decreased. Therefore, the sharpness of brightness change can be improved without increasing the elastic constant ratio $K_{33}/K_{11}$ of the liquid crystal member to 1.75 or more.

Also in this case, the liquid crystal molecule twisting force and the response speed are increased by increasing the value d/p obtained by dividing the liquid crystal layer thickness d by the natural pitch p of the liquid crystal member to more than 0.5. In addition, the brightness change sharpness is improved by decreasing the vertical component $\epsilon\perp$ of the dielectric constant $\epsilon$ to 4 or less.

The liquid crystal layer of the present invention uses the liquid crystal member with an average dielectric constant $\bar{\epsilon}$ (which is defined by an expression $\bar{\epsilon} = (\epsilon\| + 2\epsilon\perp)/3$) of 6 or less. The liquid crystal member with a small average dielectric constant $\bar{\epsilon}$ is free from display irregularity due to a long time operation with ionic impurities because it hardly accepts the ionic impurities. Therefore, the reliability is improved.

Also, for the liquid crystal member with a small vertical component $\epsilon\perp$ of the dielectric constant $\epsilon$, the brightness change sharpness and the reliability of the liquid crystal display element are improved because the average dielectric constant $\bar{\epsilon}$ is small.

To improve the reliability of the liquid crystal display element, it is preferable to give a value more than 40 dyn/cm to the polarity force component $\gamma p$ of the surface energy of R of the aligning film for aligning the liquid crystal molecule of liquid crystal member in a certain direction. Because an aligning film with the surface-energy polarity force component $\gamma p$ of more than 40 dyn/cm absorbs ionic impurities in the liquid crystal member, the number of movable ions in the liquid crystal member decreases and the reliability of the liquid crystal display element is improved.

The liquid crystal display element of the present invention can be used in combination with the optical compensation element for compensating retardation for each optical wavelength. One or more retardation plates can be used for the optical compensation element by arranging them between the first and second polarizing plates. It is also possible to use a liquid crystal cell for compensation made by sealing a liquid crystal layer whose liquid crystal molecule is twisted in the direction opposite to the twist direction of the liquid crystal molecule of the previously-mentioned liquid crystal layer between the substrates which face each other by arranging the liquid crystal cell between first and second polarizing plates.

Thus, for the liquid crystal display element using the optical compensation element, the difference of retardation between wavelengths of the light passing through the element is compensated by the optical compensation element. Therefore, black-and-white display can be obtained because the display screen is hardly colored.

For a liquid crystal display element with no optical compensation element, it is preferable that the polarization axis (transmission axis or absorption axis) of the polarizing plate at the light incoming side is set to approx. 100° and the polarization axis (transmission axis and absorption axis) of the polarizing plate at the light outgoing side is set to approx. 50° from the aligning treatment direction of the light-outgoing-side substrate respectively.

When one retardation plate is used as the optical compensation element, it is preferable that the twist angle of the liquid crystal molecule of the liquid crystal layer is set between 230° and 250°, and the polarization axis of the polarizing plate at the light incoming side is set to approx. 105°, that of the polarizing plate at the light outgoing side is set to approx. 40°, and the optical axis (slow axis) of the retardation plate is set to approx. 80°, from the aligning treatment direction of the light-outgoing-side substrate respectively. By adding a reflector to the liquid crystal display element, a reflective-type liquid crystal display element can be obtained. When two retardation plates are used as the optical compensation element, it is preferable that the twist angle of the liquid crystal molecule of the liquid crystal layer is set between 230° and 250°, and the polarization axis (transmission axis) of the polarizing plate at the light incoming side is set between approx. 10° and 20° and that of the polarizing plate at the light outgoing side is set between approx. 100° and 110°, and the optical axis (slow axis) of the retardation plate at the liquid crystal layer side is set between approx. 85° and 95° and that of the retardation plate at the polarizing plate side is set between approx. 50° and 60°, from the aligning treatment direction of the light-outgoing-side substrate respectively. It is also preferable that the value of $\Delta nd$ of these retardation plates ranges between 340 and 460 nm.

When a liquid crystal cell for compensation is used as the optical compensation element, it is preferable that the value of $\Delta nd$ of the compensation cell ranges between 0.85 and 0.95 of the value of $\Delta nd$ of the liquid crystal layer.

DETAILED DESCRIPTION OF THE PREFERRED EMBODIMENTS

The following is the detailed description of the embodiments according to drawings.

First Embodiment

Figure 1:
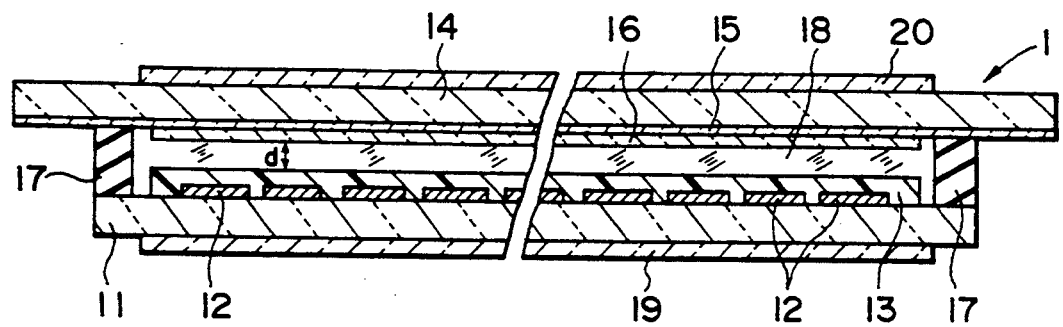
FIG. 1 is a sectional view of the first embodiment of the present invention.

The first embodiment is described below according to FIGS. 1 through 3. In FIG. 1, a plurality of first electrodes 12 including striped transparent conductive films extending in the direction vertical to the paper surface and an aligning film 13 covering the first electrodes 12 are formed on a lower substrate 11 made of a glass plate or isotropic plastic plate. The surface of the aligning film 13 is subjected to the aligning treatment in a certain direction. An upper substrate 14 facing the lower substrate 11 is made of a glass plate or isotropic plastic plate. A plurality of second electrodes 15 including striped transparent conductive films extending in the direction parallel to the paper surface are formed on the lower surface facing the lower substrate 11 so that they are respectively orthogonal to the first electrodes 12. An aligning film 16 is formed on the upper substrate 14 so that it covers a plurality of second electrodes 15 and the film surface is subjected to the aligning treatment. The upper substrate 14 and the lower substrate 11 are installed so that their surfaces with electrodes 12 and 16 face each other, and they are bonded by a seal member 17, thus forming a gap of 4 to 9 μm between them. A liquid crystal member 18 is sealed between the upper substrate 14 and lower substrate 11. Polarizing plates 19 and 20 are arranged outside the upper and lower substrates 14 and 11 bonded by the seal member 17.

The aligning films 13 and 16 are formed by a high-tilt aligning film made of macromolecules such as polyimide giving a pre-tilt angle of 6° or more to the liquid crystal molecules, adjacent to the aligning films 13 and 16, of the liquid crystal member 18. As shown in FIG. 2, the aligning film 13 is subjected to rubbing treatment so that the direction 13a of the aligning treatment crosses counterclockwise at an angle of approx. 30° and the aligning film 16 of the upper substrate 14 is provided with rubbing treatment so that the direction 16a of the aligning treatment crosses clockwise at an angle of approx. 30°, from the horizontal line h parallel with the margin of the liquid crystal cell 1 respectively.

The liquid crystal molecules of the liquid crystal member 18 are arranged from the aligning treatment direction 13a of the lower substrate 11 toward the aligning treatment direction 16a of the upper substrate 14 being twisted by approx. 240°±10° clockwise on the drawing. The product Δnd of the optical anisotropy Δn and the thickness d of liquid crystal is set between 0.75 and 0.90.

The polarization axis (transmission axis) 20a of the polarizing plate 20 is turned by the angle α counterclockwise from the aligning treatment direction 16a of the aligning film 16 formed on the upper substrate 14. The polarization axis 19a (transmission axis) of the polarizing plate 19 is turned by the angle β counterclockwise from the aligning treatment direction 16a of the aligning film 16. For example, the angle α of the polarization axis (transmission axis) 20a of the polarizing plate 20 is set to 50° from the aligning treatment direction 16a and the angle β of the polarization axis (transmission axis) 19a of the polarizing plate 19 is set to 100° from the aligning treatment direction 16a.

The liquid crystal member mainly contains a liquid crystal composition having positive dielectric anisotropy composed so that a liquid crystal compound with the large elastic constant ratio $K_{33}/K_{11}$ shown by the ratio of the bent elastic constant $K_{33}$ to the splay elastic constant $K_{11}$ is more blended, liquid crystal compound with a cyano group is less blended, and no ester linkage or heterocyclic compound is contained therein. The liquid crystal member contains optical active substances such as chiral liquid crystal. The liquid crystal composition has the dielectric constant ratio $\Delta\epsilon/\epsilon\perp$ (which is shown by the ratio of the dielectric anisotropy $\Delta\epsilon$ to the dielectric constant $\epsilon\perp$ (vertical component of dielectric constant) orthogonal to the liquid crystal molecule axis) of 2 or less, the elastic constant ratio $K_{33}/K_{11}$ (which is shown by the ratio of the bent elastic constant $K_{33}$ to the splay elastic constant $K_{11}$) of 1.75 or more, and the average dielectric constant $\bar\epsilon[\bar\epsilon=(\epsilon\|+2\epsilon\perp)/3]$ of 6 or less.

For this embodiment, the change of the liquid crystal molecule aligning state increases when an electric field is applied as the result of increasing the twist angle of the liquid crystal molecule to 240°, and the change of the dielectric constant of the liquid crystal layer decreases even if the aligning state of the liquid crystal molecule changes when an electric field is applied as the result of decreasing the dielectric constant ratio $\Delta\epsilon/\epsilon\perp$ of the liquid crystal member to 2 or less. Therefore, the change of the effective field intensity applied to the liquid crystal layer decreases and the brightness change sharpness is greatly improved. Moreover, the change of the liquid crystal molecule aligning state increases due to application of the electric field because of the intermolecular force in the direction orthogonal to the longitudinal axis of the liquid crystal molecule as the result of increasing the elastic constant ratio $K_{33}/K_{11}$ to 1.75 or more.

Accordingly, the brightness change sharpness is improved. Therefore, a time-division driving at the duty ratio of 1/400 is realized and very high contrast is obtained.

As the elastic constant ratio $K_{33}/K_{11}$ of the liquid crystal member increases, the intermolecular force in the direction orthogonal to the longitudinal axis of the liquid crystal molecule increases. Therefore, it is difficult to stably twist and align the liquid crystal molecules. However, for this embodiment, stable twist aligning is obtained throughout the display screen because the pre-tilt angle of 6° or more is given to the liquid crystal molecules adjacent to the aligning treatment surface under the initial aligning state by the aligning film and aligning treatment.

Moreover, the liquid crystal member of this embodiment has a small average dielectric constant ratio $\bar\epsilon[\bar\epsilon=(\epsilon\|+2\epsilon\perp)/3]$ of 6 or less. Therefore, the liquid crystal member hardly takes in impurity ions. Accordingly, the reliability of the liquid crystal display element is improved. Concretely, the liquid crystal member mainly contains a liquid crystal compound with a small $\epsilon\perp$. When a liquid crystal with a small $\epsilon\perp$ is used, a liquid crystal composition with a small $\epsilon\|$ can be used in order to bring the dielectric anisotropy $\Delta\epsilon$ or $\epsilon\|-\epsilon\perp$ of the liquid crystal composition into a positive value. When $\epsilon\|$ is small, the average dielectric constant $\bar\epsilon$ of the liquid crystal composition decreases and the reliability of the liquid crystal display element is improved because the liquid crystal composition with a small average dielectric constant $\bar\epsilon$ hardly takes in impurity ions.

A liquid crystal member with a small average dielectric constant $\bar\epsilon$ has a small absolute value of dielectric constant $\epsilon$. Therefore, the capacity of each pixel formed by the electrodes which face each other and the liquid crystal member between them decreases and electric charges are quickly charged or discharged. As a result, afterimages on a display screen can be decreased. Also because the capacity of each pixel decreases, it is possible to decrease the capacity of the driving circuit for supplying signals to each pixel. Therefore, the driving circuit structure can be simplified and compact.

Table 1 shows the characteristic values of the liquid crystal members A and B used for the present invention and those of the liquid crystal members X, Y, and Z used for comparison examples of the present invention. For examples 1-1 and 1-2 with different thickness d of the liquid crystal layers when the liquid crystal A among the above liquid crystals is used for the liquid crystal cell 1 shown in FIG. 1, the structure of the element and the electrooptical characteristic at the measurement temperature of 25° C. when the liquid crystal display element is observed from the direction of the normal line are shown in Table 2. In Table 2, Vth is the operating voltage to obtain the maximum contrast value. For comparison with this embodiment, comparison examples 1 through 4 using liquid crystal members X through Z are also shown in Table 2.

From Table 2, it is found that the examples 1-1 and 1-2 can be driven at the duty ratio of 1/400 because the twist angle is set to 240°, the dielectric constant ratio $\Delta\epsilon/\epsilon\perp$ is set to 2 or less, and the elastic constant ratio $K_{33}/K_{11}$ of the liquid crystal members is set to 1.75 or more. In this case, the contrast is as high as 44.

Meanwhile, the comparison examples 1 and 2 show the case in which the liquid crystal X with the elastic constant ratio $K_{33}/K_{11}$ of 1.75 or less is used for the liquid crystal display element with the same structure as that of the examples 1-1 and 1-2. However, the contrast is as very low as 6 or 10 compared with that of the examples 1-1 and 1-2. The comparison example 3 shows the conventional STN-type liquid crystal display element, which obtains the contrast value of 10 necessary for display at the duty ratio of approx. 1/120. However, when the number of time-divisions is increased, the contrast is further degraded. Therefore, the comparison example 3 is driven at the duty ratio of approx. 1/120 at most but high time-division driving cannot be applied to it. The comparison example 4 shows the conventional TN-type liquid crystal display element, which obtains the contrast value of 11 at most which is necessary for display at the duty ratio of approx. 1/60.

Figure 3:
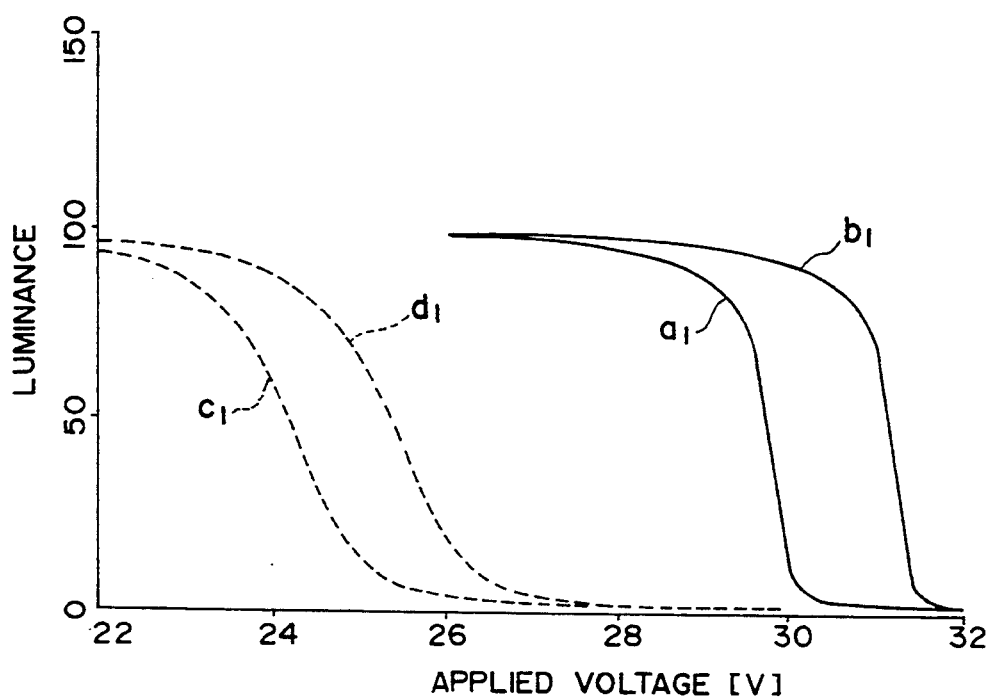
FIG. 3 is a brightness characteristic diagram showing the electrooptical characteristic of the first embodiment.

FIG. 3 shows the brightness change to the applied voltage on the above examples 1-1 and the comparison example 1. FIG. 3 shows the brightness characteristic of the example 1-1 by the on-transmittance curve $a_1$ and off-transmittance curve $b_1$ and that of the comparison example 1 by the on-transmittance curve $c_1$ and off-transmittance curve $d_1$. From the brightness characteristic shown in FIG. 3, it is found that the example 1-1 is more sharp than the comparison example 1 in the brightness change and superior to the comparison example 1 in the time-division characteristic.

For this embodiment, the aligning stability is improved by increasing the pre-tilt angle. That is, the aligning stability of a liquid crystal depends on the characteristic values of the liquid crystal. A liquid crystal with a large elastic constant ratio $K_{33}/K_{11}$ has a low twist aligning stability because the intermolecular force in the direction orthogonal to the longitudinal axis of the liquid crystal molecule is too large. Therefore, this embodiment improves the twist aligning stability by setting the pre-tilt angle to 6° or more. Table 3 shows the gap margins measured for the pre-tilt angles of 6° or more and less than 6°.

In this case, the gap margin shows the difference between the upper and lower limit values of the layer thickness of the liquid crystal which can be twisted up to 240°.

That is, the gap margin of 0 μm represents that the liquid crystal is not twistingly aligned stably and that of 1.5 μm represents that it is twistingly aligned up to 240° even if the thickness of the liquid crystal layer changes within the range of 1.5 μm.

From Table 3, it is found that the liquid crystal X with a small elastic constant ratio $K_{33}/K_{11}$ has a large gap margin of 3.1 μm for the pre-tilt angle of 8° and still a large gap margin of 1.5 μm even for the pre-tilt angle of 5°. The liquid crystal A with a large elastic constant ratio $K_{33}/K_{11}$ has the gap margin of almost 0 for the pre-tilt angle of 5°. Therefore, no stable twist aligning is obtained. However, it has the gap margin of approx. 1.8 μm for the pre-tilt angle of 8°. In this case, stable 240° twist aligning is obtained. Therefore, the pre-tilt angle of more than 6°, especially of 8° or more is preferable to obtain 240° twist aligning.

Moreover, for this embodiment, the average dielectric constant $\bar{\varepsilon}$ of the liquid crystal composition is decreased, display irregularity is prevented which occurs when the liquid crystal display element is turned on for a long time, and the reliability of the liquid crystal display element is improved. The display irregularity occurs because the liquid crystal composition takes in impurity ions. However, because a liquid crystal composition with a small average dielectric constant $\bar{\varepsilon}$ hardly takes in impurity ions, the reliability of the liquid crystal display element is improved.

Table 4 shows the result of evaluating how aligning irregularity occurs when continuously driving the example 1-1 using the liquid crystal A and the comparison examples 1 and 3 using the liquid crystals X and Y for 240 hr with the rectangular waveform of 32 Hz under the environment of 45° C. From Table 4, it is found that aligning irregularity occurs in the liquid crystal Y having the average dielectric constant $\bar{\varepsilon}$ or more than 6 but it does not occur in the liquid crystals A and X having the average dielectric constant $\bar{\varepsilon}$ of 6 or less. Therefore, it is preferable that the average dielectric constant $\bar{\varepsilon}$ of liquid crystal compositions is kept at 6 or less.

Thus, according to this embodiment, sharp brightness characteristic can be obtained and a liquid crystal display element with a high contrast value of 44 can be obtained even for driving at the duty ratio of 1/400 because the twist angle is set to 240°, the dielectric constant ratio $\Delta\varepsilon/\varepsilon_{\perp}$ is set to 2 or less, and the elastic constant ratio $K_{33}/K_{11}$ of the liquid crystal member is set to 1.75 or more. Moreover, because the aligning film uses a high-tilt aligning film giving the pre-tilt angle of 6° or more or preferably 8° or more to the liquid crystal molecule, 240° twist aligning is stably obtained. In addition, the reliability of the liquid crystal display element for long-time driving is improved because the average dielectric constant $\bar{\varepsilon}$ of the liquid crystal member is set to 6 or less.

And, the electric capacity of each pixel can be decreased so that afterimages are prevented and a driving circuit with a small driving capacity can be used by further decreasing the average dielectric constant $\bar{\varepsilon}$.

Second Embodiment

The second embodiment of the present invention is described below in detail according to FIGS. 4 through 6. The second embodiment shows the case in which one retardation plate is added to the STN-type liquid crystal display element of the first embodiment as an optical compensation element for compensating the difference of retardation between transmitted-light wavelengths. Therefore, the member same as that of the first embodiment is provided with the same symbol and its description is omitted.

Figure 4:
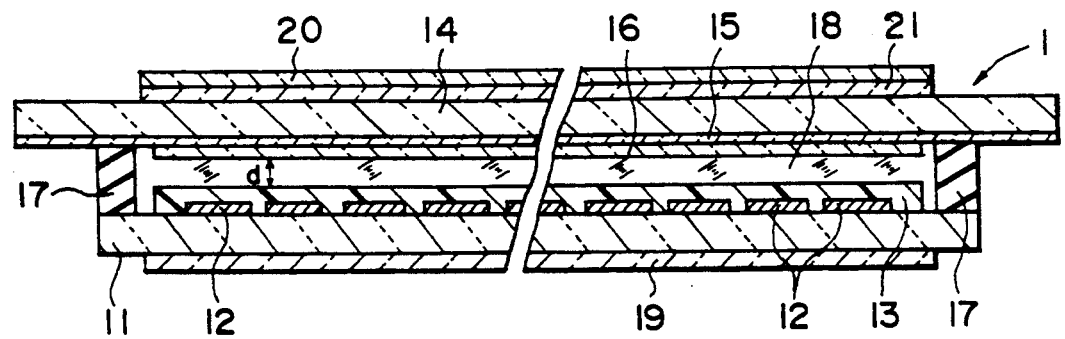
FIG. 4 is a sectional view of the second embodiment of the present invention.
Figure 5:
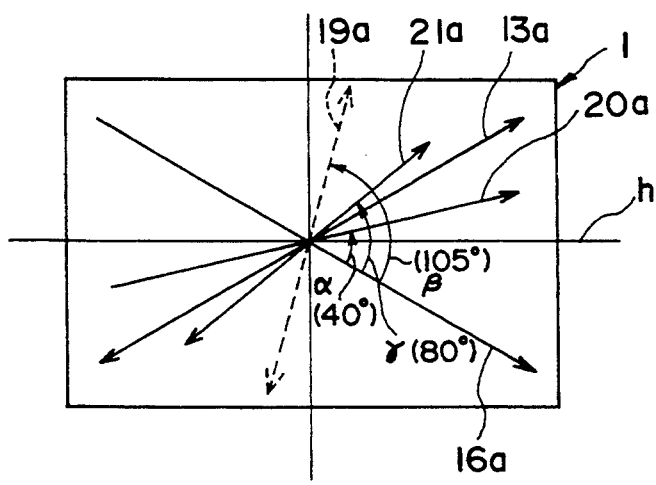
FIG. 5 is a schematic top view showing the relationship between the aligning treatment direction of the aligning film and the optical axis of the polarizing plate of the second embodiment in FIG. 2.

In FIGS. 4 and 5, a retardation plate 21 for preventing a display screen from coloring due to a difference of retardation is installed between an upper substrate 14 and polarizing plate 20 on a liquid crystal cell 1.

As shown in FIG. 5, aligning films 13 and 16 are subjected to rubbing treatment so that the aligning treatment direction 13a of the aligning film 13 crosses counterclockwise at the angle of approx. 30° and the aligning treatment direction 16a of the aligning film 16 crosses clockwise at the angle of approx. 30°, from the horizontal line h parallel with the margin of the liquid crystal cell 1 respectively, similarly to the first embodiment.

The liquid crystal molecules of a liquid crystal member 18 sealed between the aligning films 13 and 16 are arranged by being twisted clockwise by 240±10° from the aligning treatment direction 13a of the lower substrate 11 toward the aligning treatment direction 16a of the upper substrate 14 on the drawing.

The polarization axis (transmission axis) 20a of the polarizing plate 20 is turned by the angle $\alpha$ counterclockwise and the polarization axis (transmission axis) of the polarizing plate 19 is turned by the angle $\beta$ counterclockwise, from the aligning treatment direction 16a respectively. For example, the angle $\alpha$ of the polarization axis (transmission axis) 20a of the polarizing plate 20 is set to 40° and the angle $\beta$ of the polarization axis (transmission axis) 19a of the polarizing plate 19 is set to 105° from the aligning treatment direction 16a. The retardation plate 21 has the value $\Delta$nd of 500 to 600 nm and its optical axis (slow axis) 21a is set in the direction turned counterclockwise by the angle $\gamma$ (e.g. approx. 80°) from the aligning treatment direction 16a of the aligning film 16.

For this embodiment, the twist angle of the liquid crystal molecule is increased to 240°, dielectric constant ratio $\Delta\varepsilon/\varepsilon_{\perp}$ of the liquid crystal member is decreased to 2 or less, and the elastic constant $K_{33}/K_{11}$ is increased to 1.75 or more. Therefore, the brightness change sharpness is greatly improved when an electric field is applied to the liquid crystal similarly to the first embodiment. Thus, high time-division driving at the duty ratio of approx. 1/400 is realized and very high contrast is obtained.

Moreover, for this embodiment, the liquid crystal molecules adjacent to the aligning treatment surface are arranged with the pre-tilt angle of approx. 6° or more under the initial aligning state by the aligning film and aligning treatment and the average dielectric constant $\bar{\varepsilon}$ of the liquid crystal member is decreased to 6 or less. Therefore, homogeneous stable twist aligning is obtained throughout a display screen and the operation reliability is also high.

In addition, for the second embodiment, black-and-white display with little coloring is obtained because a retardation plate for compensating display coloring is installed.

Table 2 shows the element structure and the electro-optical characteristic observed from the direction normal to the liquid crystal display element at the measurement temperature of 25° C. on the example 2-1 which uses the liquid crystal member A shown in Table 1 for the liquid crystal cell shown in FIG. 4. From Table 2, it is found that the second embodiment can be driven at the duty ratio of 1/400 because the twist angle is set to 240°, the dielectric constant ratio $\Delta\epsilon/\epsilon\perp$ is set to 2 or less, and the elastic constant ratio $K_{33}/K_{11}$ of the liquid crystal member is set to 1.75 or more. Because the second embodiment has the retardation plate 21, very high contrast of 63 is obtained compared with the first embodiment.

Figure 6:
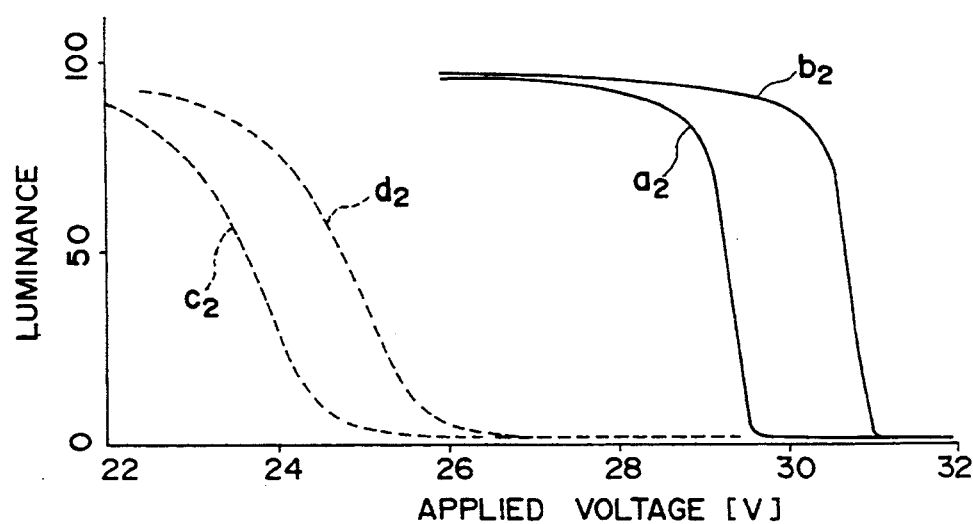
FIG. 6 is a brightness characteristic diagram showing the electrooptical characteristic of the second embodiment.

FIG. 6 shows the brightness change to the applied voltage on the example 2-1 and comparison example 2. FIG. 6 shows the brightness characteristic of the example 2-1 by an on-transmittance curve $a_2$ and off-transmittance curve $b_2$ and the brightness characteristic of the comparison example 2 by an on-transmittance curve $c_2$ and off-transmittance curve $d_2$. From the brightness characteristic shown in FIG. 6, it is found that the example 2-1 is more sharp than the comparison example 2 in the brightness change and superior to the comparison example 2 in the time-division characteristic. Table 5 shows the X- and Y-coordinate values according to the CIE chromaticity diagram on the display colors of the example 2-1 and comparison examples 1 and 2. As shown in Table 5, the comparison examples 1 and 2 show a yellowish display color but the example 2-1 and comparison example 2 show a display color close to white because colors are compensated by a retardation plate.

Especially, the example 2-1 shows a color very close to the value of paper white which is the criterion shown in Table 5.

Therefore, almost-achromatic black-and-white display is realized. According to the second embodiment, as described above, high time-division driving at the duty ratio of approx. 1/400 is realized, very high contrast is obtained, and a liquid crystal display element for black-and-white display with a high operation reliability is obtained.

Third Embodiment

Figure 7:
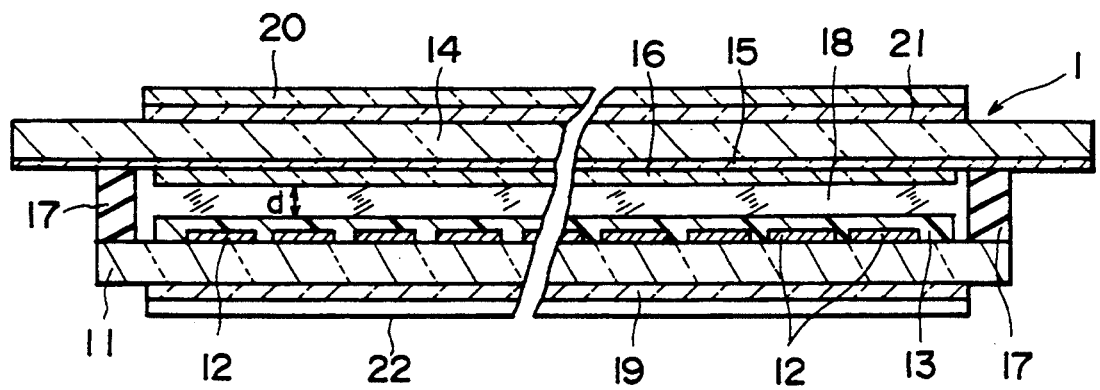
FIG. 7 is a sectional view of the third embodiment of the present invention.

The third embodiment of the present invention is described below in detail according to FIG. 7.

The third embodiment relates to a reflective-type liquid crystal display element made by installing a reflector outside the STN-type liquid crystal display element color-compensated by one retardation plate shown in the second embodiment.

Therefore, the member same as that of the second embodiment is provided with the same symbol and its description is omitted. The liquid crystal cell 1, retardation plate 21, and polarizing plates 19 and 20 of the third embodiment have the same structure as those of the second embodiment respectively, and a reflector 22 is added to the embodiment in addition to the above structure. The reflector 22 comprises an aluminum thin plate or the like, which is installed outside the polarizing plate 19 at the above upper substrate 11 side.

This embodiment greatly improves the brightness change sharpness when an electric field is applied because the twist angle of the liquid crystal molecule is increased to 240°, the dielectric constant ratio $\Delta\epsilon/\epsilon\perp$ of the liquid crystal member is decreased to 2 or less, and the elastic constant $K_{33}/K_{11}$ is increased to 1.75 or more. Therefore, high time-division driving to the duty ratio or approx. 1/400 is realized and very high contrast is obtained.

Moreover, for this embodiment, the liquid crystal molecules adjacent to the aligning treatment surface are arranged with the pre-tilt angle of approx. 6° or more under the initial aligning state by the aligning film and aligning treatment and the average dielectric constant $\bar{\epsilon}$ of the liquid crystal member is decreased to 6 or less. Therefore, homogenous stable twist aligning is obtained throughout a display screen and the operation reliability is also high.

Also for this embodiment, black-and-white display with little coloring is obtained because a retardation plate for compensating display coloring is installed.

Furthermore, because the third embodiment has the liquid crystal display element with a high contrast and the reflector, bright-enough display is obtained by external light.

The optical characteristics of the third embodiment are measured by forming a liquid crystal cell using the liquid crystal member A shown in Table 1 and changing $\Delta$nd ($\mu$m) of the liquid crystal layer 18, $\Delta$nd ($\mu$m) (hereafter referred to as R for discrimination) of the retardation plate 21, angle $\alpha$ of the polarization axis 20a of the polarizing plate 20, angle $\beta$ of the polarization axis 19a of the polarizing plate 19, and angle $\gamma$ of the optical axis 21a of the retardation plate 21 of the liquid crystal cell. Tables 6-1 through 6-4 show the measurement results, in which the X and Y coordinates of a CIE chromaticity diagram are shown on the examples 3-1 through 3-28. From Tables 6-1 through 6-4, it is found that these examples are almost achromatic and realize black-and-white display.

In this case, it is preferable that the value of R of the retardation plate 21 is 580 nm when $\Delta$nd of the liquid crystal layer 18 is 0.75 and 600 nm when $\Delta$nd of it ranges between 0.83 and 0.88.

In this case, angle $\alpha$ of the polarization axis 20a ranges between 30° and 60°, angle $\beta$ of the polarization axis 19a ranges between 95° and 120°, and the angle $\gamma$ of the optical axis 21a ranges between 70° and 90°. Black-and-white display is almost possible if $\Delta$nd of the liquid crystal layer 18 ranges between 0.75 and 0.9 $\mu$m, $\Delta$nd of the retardation plate ranges between 500 and 600 nm, angle $\alpha$ of the polarization axis 20a ranges between 30° and 60°, angle $\beta$ of the polarization axis 19a ranges between 95° and 120°, and angle $\gamma$ the optical axis 21a ranges between 55° and 90°. For this embodiment, as described above, the brightness characteristic sharpness is greatly improved, high time-division driving at the duty ratio range of approx. 1/400 is realized, and very high contrast is obtained. Moreover, because the embodiment has a retardation plate and reflector for correcting display colors, a reflective-type liquid crystal display element free from coloring can be obtained.

Fourth Embodiment

The fourth embodiment of the present invention is described below in detail according to FIGS. 8 through 10. The fourth embodiment shows the case in which two retardation plates are added to the STN-type liquid crystal display element of the first embodiment as an optical compensation element. Therefore, the member same as that of the first embodiment is provided with the same symbol and its description is omitted.

Figure 8:
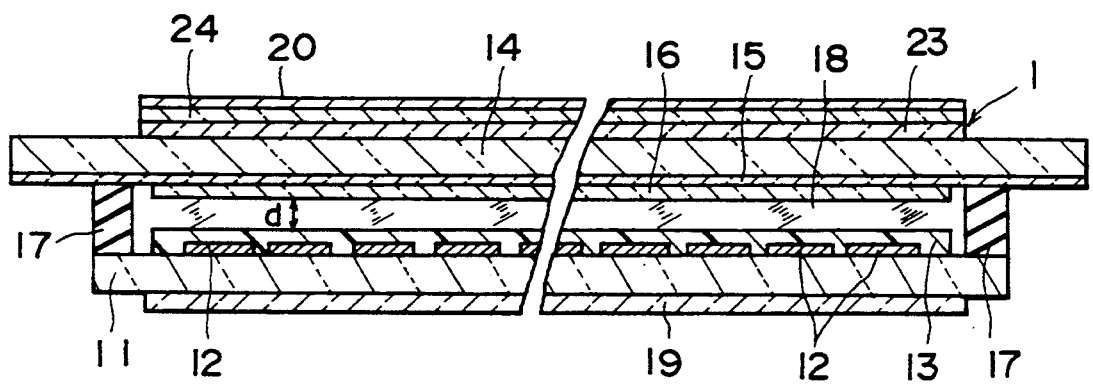
FIG. 8 is a sectional view of the fourth embodiment of the present invention.
Figure 9:
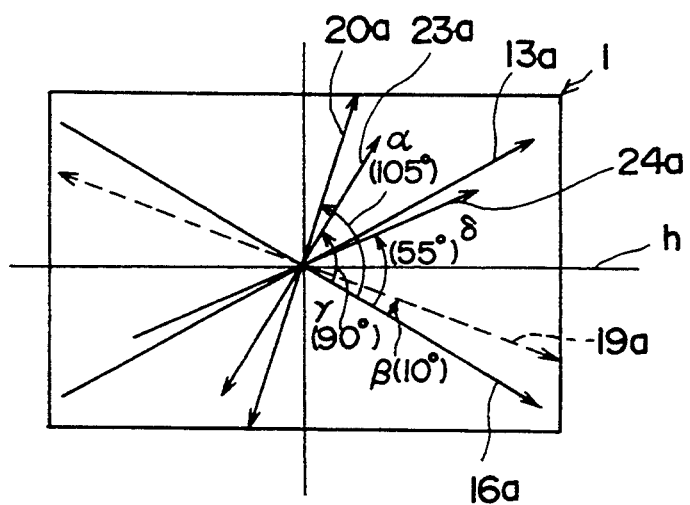
FIG. 9 is a schematic top view showing the relationship between the aligning treatment direction of the aligning film and the optical axis of the polarizing plate of the fourth embodiment in FIG. 8.

In FIGS. 8 and 9, a liquid crystal cell 1 and polarizing plates 19 and 20 have the same structure as those of the first embodiment. In addition to the structure, the first retardation plate 23 and second retardation plate 24 for preventing a display screen from coloring are installed.

In FIG. 8, aligning films 13 and 16 formed on a lower substrate 11 and upper substrate 14 are composed of an aligning film made of polyamide or the like for giving the pre-tilt angle of approx. 6° or more to the liquid crystal molecules adjacent to the aligning films 3 and 6 of the liquid crystal member 8. As shown in FIG. 2, the aligning film 13 of the lower substrate 11 is provided with rubbing so that its aligning treatment direction 13a crosses at the angle of approx. 30° counterclockwise and the aligning film 16 of the upper substrate 14 is provided with rubbing so that its aligning treatment direction 16a crosses at the angle of approx. 30° clockwise, from the horizontal line h parallel with the margin of the display element 1 respectively.

The liquid crystal molecules of the liquid crystal member 18 sealed between the aligning films 13 and 16 are arranged by being twisted clockwise by approx. 240°±10° from the aligning treatment direction 13a of the lower substrate 11 toward the aligning treatment direction 16a of the upper substrate 14 on the drawing and the product $\Delta n d$ of the optical anisotropy $\Delta n$ and the liquid crystal layer thickness d is set between 0.79 and 0.84.

The polarization axis (transmission axis) 20a of the upper polarizing plate 20 is turned counterclockwise by the angle $\alpha$ and the polarization axis (transmission axis) 19a of the lower polarizing plate 19 is turned counterclockwise by the angle $\beta$, from the aligning treatment direction 16a of the aligning film 16 respectively. For example, it is preferable that the angle $\alpha$ of the polarization axis (transmission axis) 20a of the upper polarizing plate 20 is set between 100° and 110°, especially to 105°, and the angle $\beta$ of the polarization axis (transmission axis) 19a of the lower polarizing plate 19 is set between 10° and 20°, especially to 10°, from the aligning treatment direction 16a of the aligning film 16 formed on the upper substrate 14 respectively.

Retardation plates 23 and 24 for correcting the color of transmitted light are installed between the upper substrate 14 and upper polarizing plate 20 in order to prevent a display screen from coloring. Both the retardation plates 23 and 24 have an equal value of $\Delta n d$ between 340 and 360 nm. The optical axis (slow axis) 23a of the first retardation plate 23 at the substrate 14 side is arranged so that it crosses counterclockwise at the angle $\gamma$ and the optical axis (slow axis) 24a of the second retardation plate 24 at the polarizing plate 20 side is arranged so that it crosses counterclockwise at the angle $\delta$, from the aligning treatment direction 16a of the aligning film 16 respectively.

For example, it is preferable that the angle $\gamma$ of the optical axis (slow axis) 23a is set between 85° and 95°, the angle $\delta$ of the optical axis (retardation axis) 24a is set between 50° and 60°, and, especially, the angle $\gamma$ is set to approx. 90° and the angle $\delta$ is set to approx. 55°, from the aligning treatment direction 16a respectively.

The fourth embodiment greatly improves the brightness change sharpness when an electric field is applied because the twist angle of the liquid crystal molecule is increased to 240°, the dielectric constant ratio $\Delta\epsilon/\epsilon\perp$ the liquid crystal member is decreased to 2 or less, and elastic constant ratio $K_{33}/K_{11}$ is increased to 1.75 or more. Therefore, high time-division driving at the duty ratio of approx. 1/400 is realized and very high contrast is obtained.

Moreover, for this embodiment, the liquid crystal molecules adjacent to the aligning treatment surface are arranged with the pre-tilt angle of approx. 6° or more under the initial aligning state by the aligning film and aligning treatment and the average dielectric constant $\bar{\epsilon}$ of the liquid crystal member is decreased to 6 or less. Therefore, homogenous stable twist aligning is obtained throughout a display screen and the operation reliability is also high.

In addition, because this embodiment compensates the difference of retardation between various optical wavelengths, a display screen is hardly colored and bright black-and-white display with a high contrast is obtained.

Table 2 shows the structure of the liquid crystal display element and its electrooptical characteristic observed from the direction of the normal line of it at the measurement temperature of 25° C. on the example 4-1 in which the liquid crystal display element shown in FIGS. 8 and 9 is formed using the liquid crystal B having the characteristics shown in Table 1. In Table 2, values of $\Delta n d$ of the first and second retardation plates are 360 nm respectively, the angle $\alpha$ of the polarization axis 20a of the second polarizing plate 20 is 105°, the angle $\beta$ of the polarization axis 19a of the polarizing plate 19 is 10°, the angle $\gamma$ of the optical axis 23a of the first retardation plate 23 is 90°, and the angle $\delta$ of the optical axis 24a of the second retardation plate 24 is 55°. Vth shows the operating voltage when the contrast is maximized and the contrast shows its maximum value. From Table 2, it is found that the example 4-1 can be driven at the duty ratio of 1/480 because the twist angle is set to 240°, the dielectric constant ratio $\Delta\epsilon/\epsilon\perp$ is set to 2 or less, and the elastic constant ratio $K_{33}/K_{11}$ of the liquid crystal member is set to 1.75 or more. Moreover, because the embodiment has two retardation plates 23 and 24, very high contrast value of 50 is obtained. Thus, the example 4-1 has a high contrast compared with the example 2-1 using one retardation plate in Table 2 because it uses two retardation plates and its display screen is free from coloring.

Figure 10:
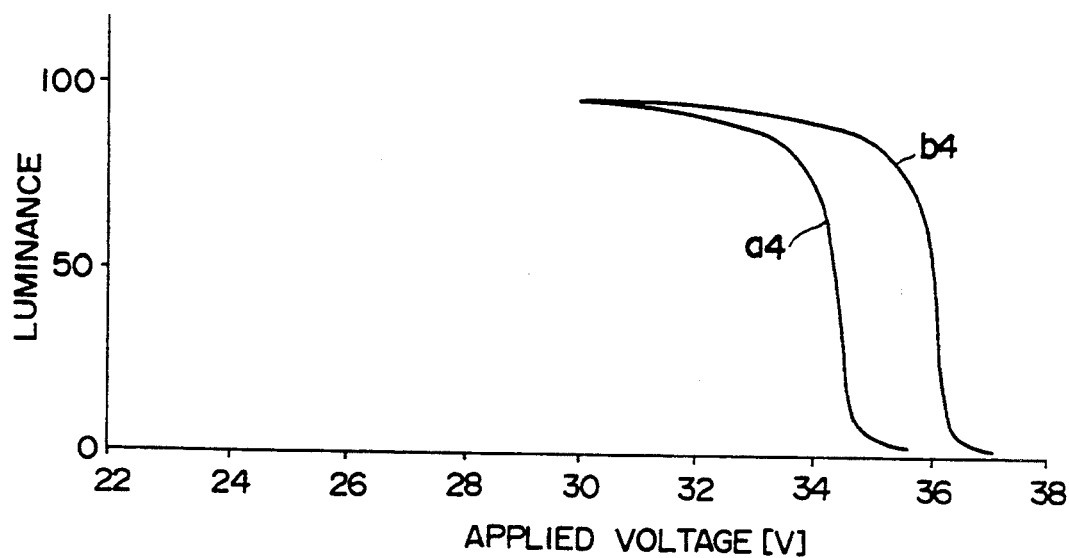
FIG. 10 is a brightness characteristic diagram showing the electrooptical characteristic of the fourth embodiment.

FIG. 10 shows the brightness characteristic obtained by showing the brightness change to the applied voltage by an on-transmittance curve $a_4$ when an on-waveform voltage is applied and an off-transmittance curve $b_4$ when an off-waveform voltage is applied on the example 4-1. From the brightness characteristic shown in FIG. 10, it is found that the example 4-1 has more sharp brightness change than the example 2-1 using one retardation plate in FIG. 6 and is superior to the example 2-1 in the time-division characteristic.

Table 5 shows the X- and Y-coordinate values based on a CIE chromaticity diagram on the display color of the example 4-1. As shown in Table 5, the example 4-1 shows the color close to the value of paper white which is the criterion shown in Table 5 and realizes almost achromatic black-and-white display because it compensates colors using two retardation plates.

Table 7 shows the X- and Y-coordinates in the CIE chromaticity diagram on the display colors of the examples 4-2 through 4-5 in which $\Delta n d$ of the liquid crystal layer, angle $\alpha$ of the polarization axis 20a of the polarizing plate 20, angle $\beta$ of the polarization axis 19a of the polarizing plate 19, angle $\gamma$ of the optical axis 23a of the first retardation plate 23, and angle $\delta$ of the optical axis 24a of the second retardation plate 24 are repetitively changed variously.

From Table 7, it is found that these examples show almost achromatic colors and realize black-and-white display. In this case, the value of $\Delta n d$ of the liquid crystal layer is set to 0.84 and the values R1 and R2 of $\Delta n d$ of the first and second retardation plates are set to 360 nm. Also, the angle $\alpha$ of the polarization axis 20a is between 15° and 20°, angle $\beta$ of the polarization axis 19a is set between 100° and 105°, angle $\gamma$ of the optical axis 23a is set to 55°, and angle $\delta$ of the optical axis 24a is set between 90° and 95°. Black-and-white display is almost possible if Δnd of the liquid crystal layer ranges between 0.79 and 0.84, R1 and R2 of Δnd of the retardation plate range between 340 and 360 nm, angle α of the polarization axis 20a ranges between 100° and 110°, angle β of the polarization axis 19a ranges between 10° and 20°, angle γ of the optical axis 23a ranges between 85° and 95°, and angle δ of the optical axis 24a ranges between 50° and 60°.

Moreover, for this embodiment, the liquid crystal cell using a liquid crystal member with a large elastic constant ratio $K_{33}/K_{11}$ has almost no gap margin and provides no stable twist aligning for the pre-tilt angle of 5° but it has a large gap margin of approx. 1.8 μm and provides stable 240° twist aligning for the pre-tilt angle of 8°, as shown in Table 3. Therefore, to obtain 240° twist aligning, it is preferable that the pre-tilt angle is 6° or more, especially 8° or more.

Furthermore, to prevent display irregularity produced when the liquid crystal display element of this embodiment is turned on for a long time and improve the reliability of the liquid crystal display element, it is preferable to decrease the average dielectric constant $\bar{\epsilon}$ of the liquid crystal composition to 6 or less, as shown in Table 4.

Thus, according to this embodiment, sharp brightness characteristic is obtained because the twist angle is set to 240°, the dielectric constant ratio $\Delta\epsilon/\epsilon\perp$ is set to 2 or less, and the elastic constant ratio $K_{33}/K_{11}$ of the liquid crystal member is set to 1.75 or more, and also a liquid crystal display element with a high contrast value of 50 or more and free from coloring is obtained because two retardation plates are installed to correct display colors. Moreover, 240° twist aligning is stably obtained because a high-tilt aligning film member for giving the pre-tilt angle of 6° or more, more preferably, 8° or more to the liquid crystal molecule is used as an aligning film, the reliability for long-time driving of the liquid crystal display element is improved because the average dielectric constant $\bar{\epsilon}$ of the liquid crystal member is set to 6 or less, and afterimages on the screen are prevented and a driving circuit with a small driving capacity can be used by further decreasing the average dielectric constant $\bar{\epsilon}$.

Fifth Embodiment

The fifth embodiment of the present invention is described below in detail according FIGS. 11 through 16.

The fifth embodiment uses a liquid crystal member having the characteristic shown in Table 8 for the liquid crystal cell having the same structure as that of the first and second embodiments. Therefore, the member same as that of the first and second embodiment is provided with the same symbol and its description is omitted.

In the fifth embodiment, aligning films 13 and 16 are composed of high-tilt aligning film made of polyimide or the like with a large polarizing-force component γp of the surface energy in order to give the pre-tilt angle of 6° or more to adjacent liquid crystal molecules and absorb movable ions in the liquid crystal member 18. And the aligning films 13 and 16 are provided with aligning treatment, similarly to those of the first embodiment. It is preferable that the polarizing force component γp of the surface energy of the aligning films 13 and 16 is larger than 40 dyn/cm. The fifth embodiment uses an aligning member with the surface-energy polarizing-force component γp of 42.1 dyn/cm.

The liquid crystal molecules of the liquid crystal member 18 sealed between the aligning films 13 and 16 are twistingly arranged by approx. 240°±10° clockwise from the aligning treatment direction 13a of the lower substrate 11 toward the aligning treatment direction 16a of the upper substrate 14 on the drawing, and the product Δnd of the optical anisotropy Δn of the liquid crystal and the liquid crystal layer thickness d is set between 0.75 and 0.90. The liquid crystal member 18 has the dielectric constant ratio $\Delta\epsilon/\epsilon\perp$ (which is the ratio of the dielectric anisotropy Δε to the dielectric constant $\epsilon\perp$ (vertical component of dielectric constant) with the direction orthogonal to the liquid crystal molecule axis) of 2 or less, the ratio d/p (which is the ratio of the liquid crystal layer thickness d to the natural pitch p) of 0.5 or more, the vertical component of dielectric constant $\epsilon\perp$ of 4 or less, and the average dielectric constant $\bar{\epsilon}$ of less than 6.

For this embodiment, it is preferable that the value of d/p is 0.55 and the elastic constant ratio $K_{33}/K_{11}$ of the liquid crystal member is as large as possible. That is, it is preferable that the elastic constant ratio $K_{33}/K_{11}$ is 1.75 or more by using a liquid crystal composition made of more liquid crystal compound with a large elastic constant ratio $K_{33}/K_{11}$ and less liquid crystal compound with a cyano group, excluding and ester linkage or heterocyclic compound.

Figure 2:
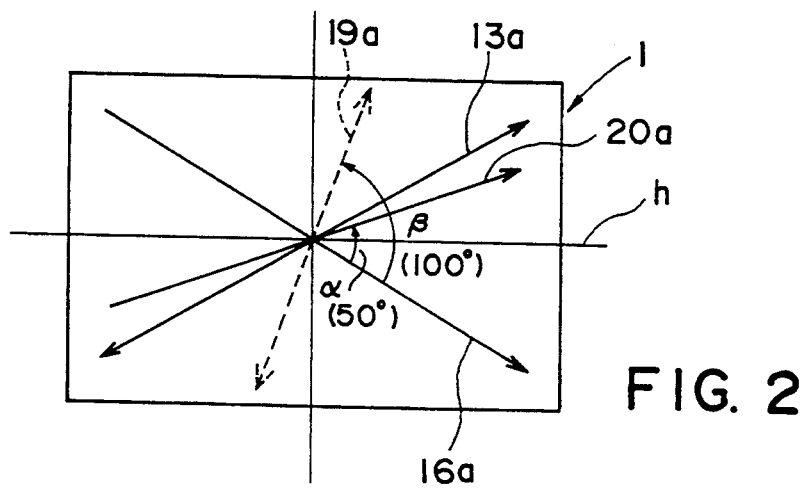
FIG. 2 is a schematic top view showing the relationship between the aligning treatment direction of the aligning film and the optical axis of the polarizing plate of the first embodiment of the present invention.

For the polarization axes 19a and 20a of the polarizing plates 19 and 20, the angle α is set between 30° and 60° and the angle β is set between 95° and 120°, similarly to FIG. 2. In this case, it is preferable that the angle α is 50° and the angle β is 100°. By this configuration, a yellow-mode STN-type liquid crystal display element with light yellow background is formed.

The fifth embodiment can be applied to the liquid crystal display element with the same structure as that of the previously-mentioned second embodiment. That is, a retardation plate for preventing the display from coloring is installed between the upper substrate 14 and polarizing plate 20. For the polarizing plates 19 and 20 and the retardation plate 21, the angle α is set to 40°, the angle β is set to 105°, and the angle γ is set between 55° and 90°. It is preferable that the retardation plate 21 as Δnd of 500 to 600 nm and the installation angle γ of the optical axis (retardation axis) of approx. 80°.

For the above embodiment, the change of effective field intensity applied to the liquid crystal layer decreases and the brightness change sharpness is greatly improved because the difference of absolute value between $\epsilon\parallel$ and $\epsilon\perp$ decreases and the liquid crystal layer has only a small dielectric constant change even if the aligning state of the liquid crystal molecule changes when an electric field is applied, by decreasing the dielectric constant ratio $\Delta\epsilon/\epsilon\perp$ of the liquid crystal member to 2 or less.

Figure 11:
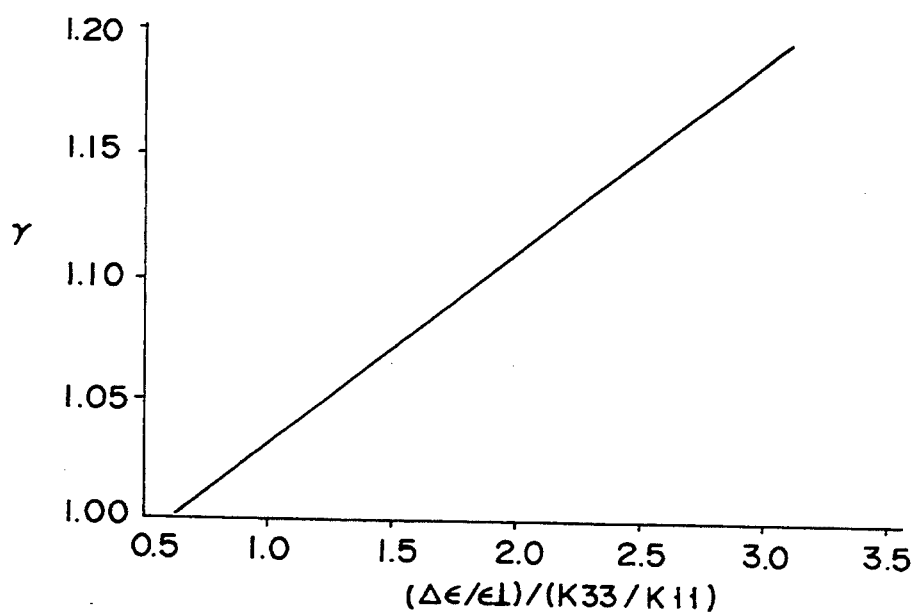
FIG. 11 is a graphic showing the relationship between the dielectric constant ratio and γ characteristic in the fifth embodiment of the present invention.
Figure 12:
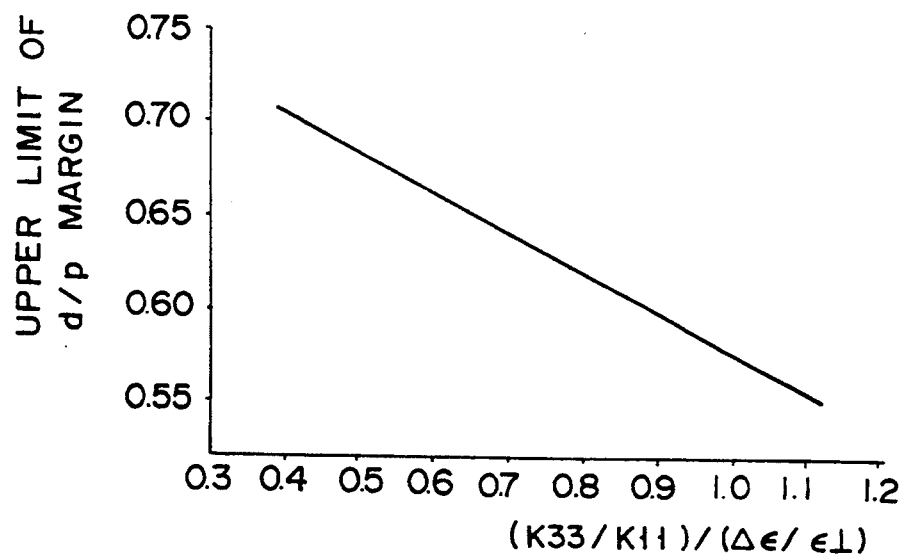
FIG. 12 is a graphic showing the relationship between the dielectric constant ratio and d/p margin in the fifth embodiment of the present invention.
Figure 13:
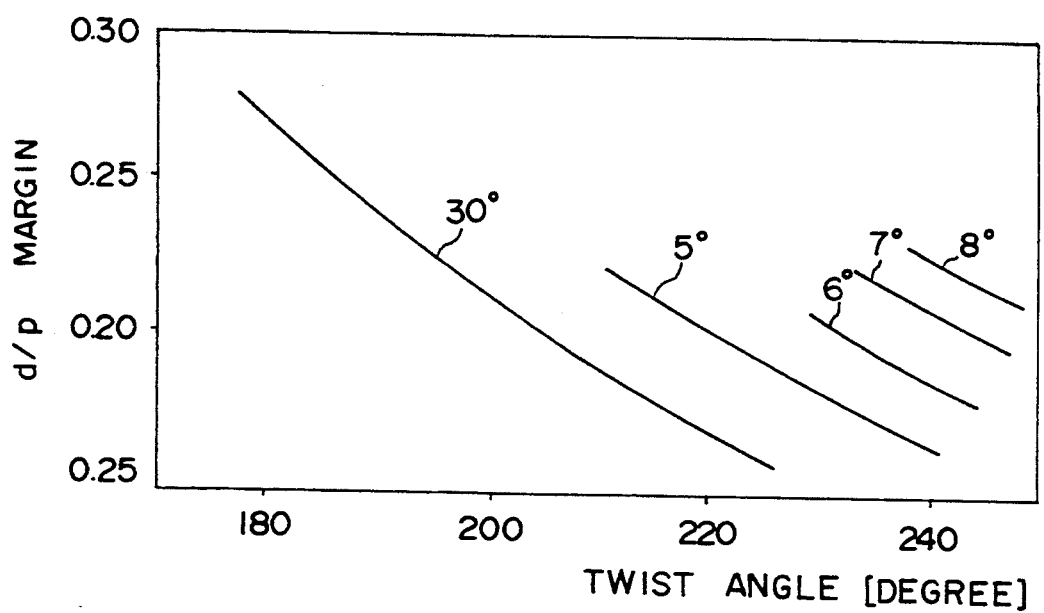
FIG. 13 is a graphic showing the relationship between the twist angle and d/p margin in the fifth embodiment of the present invention.

That is, as shown in FIG. 11, the sharpness 65 of the liquid crystal display element approaches 1.0, or it is improved as the elastic constant ratio $K_{33}/K_{11}$ of the liquid crystal member increases and the dielectric constant ratio $\Delta\epsilon/\epsilon\perp$ of it decreases. When the dielectric constant ratio $\Delta\epsilon/\epsilon\perp$ is 2 or less, very satisfactory sharpness is obtained. In this case, if the dielectric constant ratio $\Delta\epsilon/\epsilon\perp$ of the liquid crystal member is decreased to 2 or less, no stable twist aligning is obtained because the d/p margin decreases and the upper limit of the d/p margin decreases as shown in FIG. 12. For this embodiment, however, the d/p margin can be decreased as shown in FIG. 13 by setting the pre-tilt angle of the liquid crystal molecule to 6° or more or preferably to 8° or more. Therefore, even if the twist angle is increased to 240°, stable aligning state is obtained because the d/p margin is large enough.

Thus, for this embodiment, the brightness change sharpness for the applied voltage of the liquid crystal display device is improved, the response speed increases, high time-division driving at the duty ratio of 1/400 is realized, and a high contrast is obtained. Also, homogeneous and stable twist aligning is obtained throughout the display screen.

Figure 14:
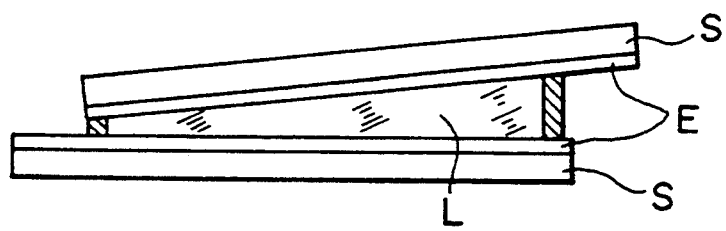
FIG. 14 is a sectional view of the liquid crystal cell for measuring the d/p margin.
Figure 15A:
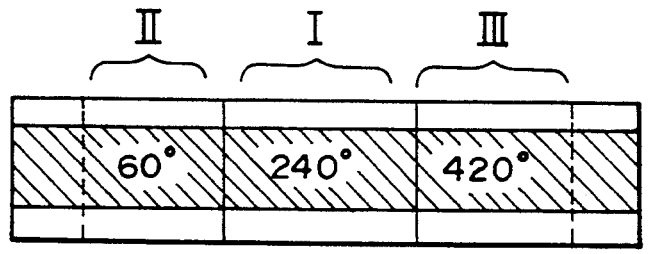
FIG. 15A shows the definition of the d/p margin, which is a schematic top view showing the initial aligning state of the liquid crystal sealed in the liquid crystal cell shown in FIG. 14.
Figure 15B:
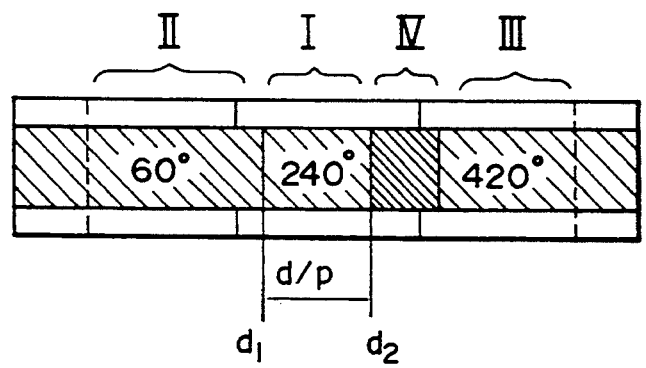
FIG. 15B shows the definition of the d/p margin, which is a schematic top view showing the aligning state of the liquid crystal sealed in the liquid crystal cell shown in FIG. 14 after an electric field is applied.
Figure 16:
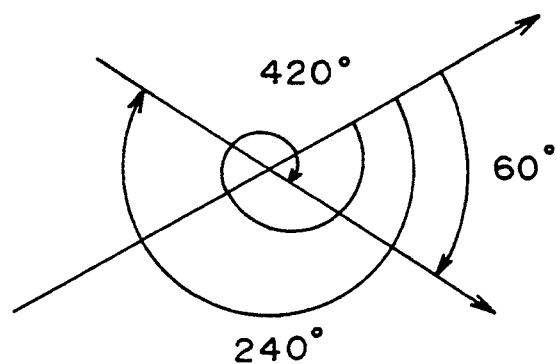
FIG. 16 shows the definition of the d/p margin, which is a diagram showing the aligning angle in the area in FIGS. 15A and 15B respectively.

The d/p margin is defined as follows. As shown in FIG. 14, substrates S are installed so that they diagonally face each other. Therefore, the thickness of the liquid crystal layer changes. Under the initial state, the liquid crystal L between the substrates S is twistingly aligned at the required angle (240°) in the area I with the specified liquid crystal layer thickness as shown in FIGS. 15A and 16. However, the liquid crystal L is twistingly aligned only at the angle of 60° in the area II with a small liquid crystal layer thickness but it is twistingly aligned at the angle of 420° in the area III with a large liquid crystal layer thickness. After the liquid crystal layer is operated by applying an electric field to it, the lower limit of the area II twistingly aligned at the specified angle of 240° rises and the area IV with striped domains at the upper limit side appears. When assuming the liquid crystal layer thickness at the lower limit of the area I as $d_1$ and that at the upper limit of it as $d_2$ in FIG. 15B, the d/p margin $\Delta$·is defined by the following expression.

$$\Delta \cdot d/p = d_2/p - d_1/p$$

For this embodiment, because the polarity force component $\gamma p$ of the surface energy of the aligning films 13 and 16 is increased to more than 40 dyn/cm, movable ions in the liquid crystal member 18 are absorbed in the aligning films 13 and 16.

In addition, because the average dielectric constant $\bar{\epsilon}$ of the liquid crystal member is set to 6 or less, impurity ions are hardly taken in the liquid crystal member 18 and the operating stability and reliability of the liquid crystal display element are improved.

And, when the vertical component $\epsilon\perp$ of the dielectric constant of the liquid crystal member 18 of this embodiment is less than 4, the value of $\epsilon \parallel$ for making the dielectric anisotropy $\Delta\epsilon$ of the liquid crystal member 18 positive decreases. Accordingly, the average dielectric constant $\bar{\epsilon}$ decreases and the reliability of the liquid crystal display element is improved. Moreover, the brightness change sharpness is improved when the vertical component $\epsilon\perp$ of the dielectric constant of the liquid crystal member 18 is small. That is, the aligning of liquid crystal molecules close to the aligning film is not changed even if an electric field is applied because aligning control force strongly works on the molecules. Under the above condition, the electric field is applied from the direction approximately orthogonal to the longitudinal axis of the liquid crystal molecules close to the aligning film. In this case, when the vertical component $\epsilon\perp$ of the dielectric constant $\epsilon$ is small, the tracking performance of liquid crystal molecule movement for the applied electric field is improved because the field strength substantially applied to the liquid crystal molecules moved by interaction with the electric field is not decreased and adequate electric field is applied to the moving liquid crystal molecules. Therefore, the brightness change sharpness is improved.

Figure 17:
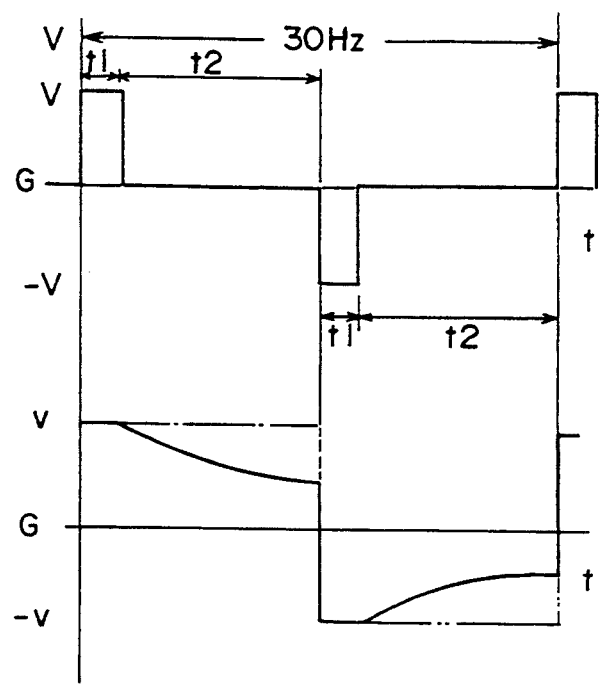
FIG. 17 is a diagram showing the definition of the voltage holding rate.
Figure 18:
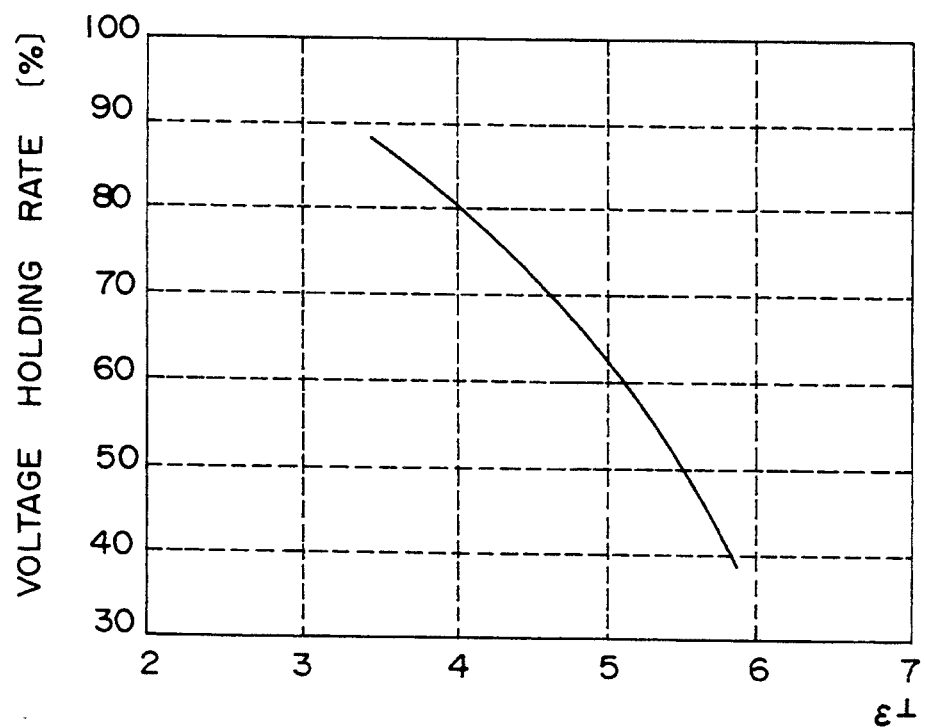
FIG. 18 is a graphic showing the relationship between the vertical component of the liquid crystal dielectric constant and the voltage holding rate in the fifth embodiment of the present invention.

Moreover, when a liquid crystal member with a small average dielectric constant $\bar{\epsilon}$ is used, the capacity of each pixel formed by the electrodes which face each other and the liquid crystal member between the electrodes decreases and electric charges are quickly charged or discharged because the absolute value of the dielectric constant $\epsilon$ is small. As a result, afterimages on the display screen can be decreased. In addition, because the capacity of each pixel decreases, the driving capacity of the driving circuit for supplying signal to the pixel can be decreased, the structure of the driving circuit is simplified, and the size of the driving circuit is decreased. The number of movable ions in the above liquid crystal member 18 corresponds to the voltage holding rate. The voltage holding rate, as shown in FIG. 17, is a value shown by the change rate of the rms (root mean square) value of the voltage $v$ between electrodes obtained by repeatedly executing the operation of applying the voltage V to the faced electrodes arranged so that they sandwich the liquid crystal for the time of $t_1$ (60 $\mu s$) and leaving the electrodes for the remaining time of $t_2$ at the cycle of 30 Hz. In other words, the voltage holding rate is a value obtained by dividing the area enclosed by a continuous line showing the reference potential G and the inter-electrode voltage $v$ by the area enclosed by a two-dot chain line showing the reference voltage G and an ideal voltage waveform, as shown in FIG. 17. FIG. 18 shows the results of measuring the voltage holding rate using liquid crystal members with various dielectric constant vertical components $\epsilon\perp$, that is, the relationship between the voltage holding rate and the vertical component $\epsilon\perp$ of liquid crystal dielectric constant.

From FIG. 18, it is found that the voltage holding rate increases as the dielectric constant vertical component $\epsilon\perp$ decreases and the voltage holding rate exceeds 80% when the dielectric constant vertical component $\epsilon\perp$ is less than 4. Therefore, a liquid crystal display element with very high operating stability and reliability can be obtained by using a liquid crystal member with the voltage holding rate of more than 80%. Thus, it is possible to apply the relationship between the voltage holding rate and the dielectric constant vertical component $\epsilon\perp$ to the inspection of the liquid crystal display element. That is, it is possible to easily evaluate the operating stability and reliability of the liquid crystal display element only by measuring the voltage holding rate which is an electrical characteristic of the liquid crystal display element.

The following is the description of concrete examples of this embodiment. Table 9 shows the structure of the liquid crystal display element shown in FIGS. 1 and 4 and the electrooptical characteristic of the liquid crystal display element observed from the direction of the normal line of the element at the measurement temperature of 25° C.

The liquid crystal display element shown in FIG. 1 is in the yellow mode without using a retardation plate, where the angle $\alpha$ of the polarization axis 20a of the polarizing plate 20 is set to 50° and the angle $\beta$ of the polarization axis 19a of the polarizing plate 19 is set to 100°. The liquid crystal display element shown in FIG. 4 is in the black-and-white mode using a retardation plate 21, where $\Delta nd$ of the retardation plate 21 is set to 600 nm, the angle $\alpha$ of the polarization axis 20a of the polarizing plate 20 is set to 40°, the angle $\beta$ of the polarization axis 19a of the polarizing plate 19 is set to 105°, and the angle $\gamma$ of the optical axis 21a of the retardation plate 21 is set to 80°.

Vth is the operating voltage for obtaining the maximum value of contrast.

As shown in Table 9, examples 5-1 and 5-2 show a liquid crystal display element with no retardation plate similar to the first embodiment, and a sharp brightness characteristic is obtained, short response times of 320 and 250 msec are obtained, and the driving at the duty ratio of 1/400 is realized because the twist angle is set to 240°, the dielectric constant ratio $\Delta\epsilon/\epsilon\perp$ is set to 2 or less, and the pre-tilt angle is set to 8. Also, examples 5-3 and 5-4 show a liquid crystal display element having one retardation plate similar to the second embodiment. Because the examples have a retardation plate 12 for correcting display colors is installed, a quick response time is obtained, the driving at the duty ratio of 1/400 is realized, and high contrast values of 36 and 22 are obtained. In this case, the contrast rises as the elastic constant ratio $K_{33}/K_{11}$ increases. That is, the contrast value is approx. 10 for the elastic constant ratio $K_{33}/K_{11}$ of 1.75 or less but it greatly rises up to approx. 63 for the ratio $K_{33}/K_{11}$ of more than 1.75. Therefore, to raise the contrast value, it is preferable that the elastic constant ratio $K_{33}/K_{11}$ is 1.75 or more. Moreover, when examples 5-1 through 5-4 have the average dielectric constant of 6 or less, no aligning irregularity is produced in the liquid crystal member 8 and the operation is stabilized because impurity ions are hardly taken in them.

Thus, according to this embodiment, a sharp brightness characteristic is obtained, the response time is shortened, and a high contrast is obtained even for the driving at the duty ratio of 1/400 because the twist angle is set to 240°, the pre-tilt angle is set to 6° or more, the dielectric constant ratio $\Delta\epsilon/\epsilon\perp$ is set to 2 or less, the dielectric constant $\epsilon\perp$ is set to less than 4, and the average dielectric constant $\bar\epsilon$ is set to 6 or less.

Moreover, because a high-tilt aligning film giving the pre-tilt angle of 6° or more, more preferably 8° or more to the liquid crystal member and with a large surface energy of 40 dyn/cm or more is used for the aligning films 3 and 6, 240° twist aligning is stably obtained, movable ions in the liquid crystal member can be absorbed, and moreover, impurity ions are hardly taken in the liquid crystal member, aligning irregularity can be prevented, and long-time operation stability and reliability of the liquid crystal display element are improved because the average dielectric constant $\bar\epsilon$ of the liquid crystal member is set to 6 or less.

It is also possible to decrease the electric capacity of each pixel, prevent afterimages, and use a driving circuit with a small driving capacity by further decreasing the average dielectric constant $\bar\epsilon$.

Therefore, a sharp threshold characteristic, high contrast, satisfactory brightness change sharpness, and high-speed response are obtained and high time-division driving is realized.

Sixth Embodiment

The sixth embodiment of the present invention is described below in detail according to FIGS. 19, 20a, and 20B.

The sixth embodiment shows the case in which a liquid crystal cell for compensation made by twisting liquid crystal molecules in the reverse rotational direction is added to the STN-type liquid crystal display element of the previously-mentioned first embodiment as an optical compensation element.

Figure 19:
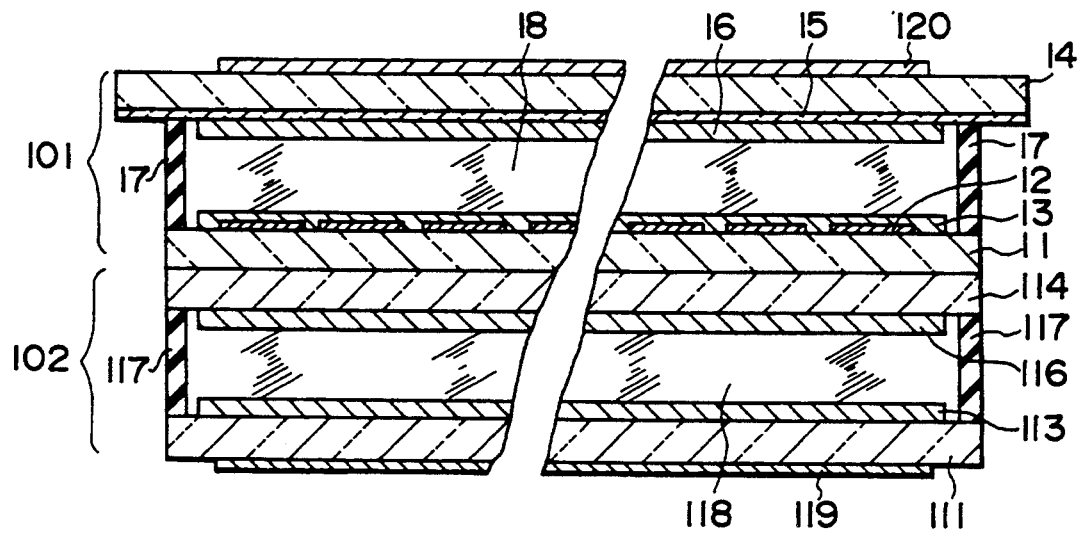
FIG. 19 is a sectional view of the sixth embodiment of the present invention.
Figure 20A:
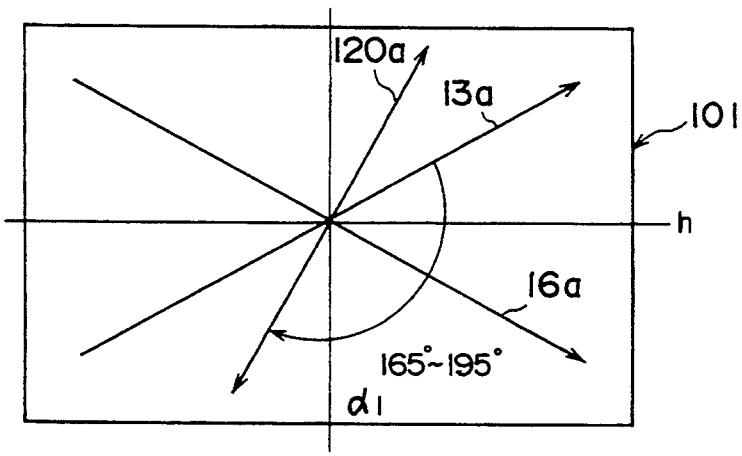
FIG. 20A is a schematic top view showing the relationship between the aligning treatment direction of the aligning film and the optical axis of the polarizing plate at the driving cell side in the sixth embodiment in FIG. 19.
Figure 20B:
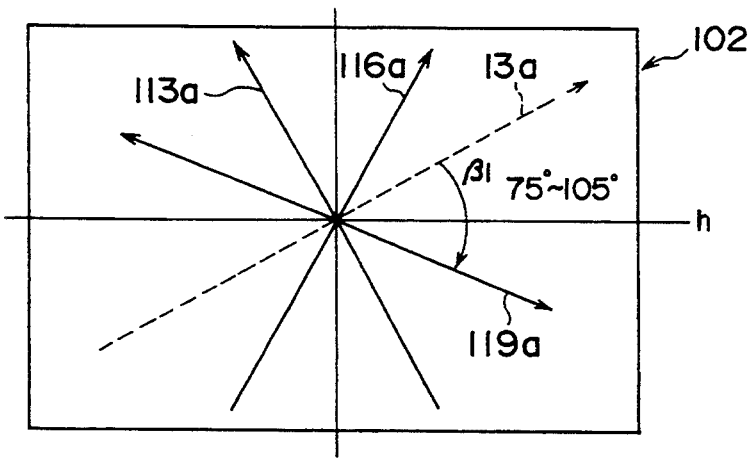
FIG. 20B is a schematic top view showing the relationship between the aligning treatment direction of the aligning film and the optical axis of the polarizing plate at the compensation cell side in the sixth embodiment in FIG. 19.

In the sixth embodiment, a driving cell 101 shown in FIG. 19 has the same structure as that of the liquid crystal cell of the previously-mentioned fifth embodiment. Therefore, the same member as that of the fifth embodiment is provided with the same symbol and its description is omitted.

In FIG. 19, a compensation cell 102 is installed under the driving cell 101. The compensation cell 102 has a lower substrate 111 and upper substrate 114 similar to the driving cell 101. An aligning film 113 is directly formed on the lower substrate 111. The aligning film 113 is provided with aligning treatment. An aligning film 116 is directly formed at the bottom of the upper substrate 114 which faces the lower substrate 116. The aligning film 116 is provided with aligning treatment. The aligning films 113 and 116 are arranged so that the surfaces where the aligning films 113 and 116 are formed face each other, bonded with a seal member 117 by forming a gap of 4 to 9 μm between the films, and a liquid crystal member 118 is sealed between the substrates 111 and 114. Polarizing plates 119 and 120 are arranged outside the driving cell 101 and the compensation cell 102 so that the polarizing plates sandwich the cells.

The liquid crystal member 118 sealed in the compensation cell 102 is made of the same material as the liquid crystal member 18, in which the product $\Delta nd$ of the liquid crystal optical anisotropy $\Delta n$ and the liquid crystal layer thickness $d_2$ is set between 0.75 and 0.90, and the member 118 is twistingly aligned in the direction opposite to the rotational direction of the liquid crystal member 118 of the driving cell 101. The value $\Delta nd_2$ of the compensation cell 102 is set to a value of $\Delta nd_2$ where the value obtained by dividing the $\Delta nd_2$ by the $\Delta nd_1$ of the driving cell 101 (i.e. $\Delta nd_2/\Delta nd_1$) ranges between 0.90 and 1.00.

Meanwhile, the polarization axis (transmission axis) 120a of the polarizing plate 120 is turned clockwise by the angle $\alpha_1$ and the polarization axis (transmission axis) 119a of the polarizing plate 119 is turned clockwise by the angle $\beta_1$, from the aligning treatment direction 116a of the aligning film 116 formed on the upper substrate 114 of the driving cell 101 respectively. That is, the angle $\alpha_1$ of the polarization axis (transmission axis) 120a of the polarizing plate 120 is set between 160° and 195°, preferably to 180°, and the angle $\beta_1 1$ of the polarization axis (transmission axis) 119a of the polarizing plate 119 is set between 75° and 105°, preferably to 90°, from the aligning treatment direction 116a of the aligning film 116 formed on the upper substrate 114 respectively.

The sixth embodiment realizes very stable aligning even for a small dielectric constant ratio $\Delta\epsilon/\epsilon\perp$ of 2 or less because the twist angle of the liquid crystal molecule is increased to 240°, the dielectric constant ratio $\Delta\epsilon/\epsilon\perp$ of the liquid crystal member is decreased to 2 or less, and the pre-tilt angle is increased to approx. 6° or more, similarly to the fifth embodiment. Therefore, the brightness change sharpness is greatly improved. Thus, high time-division driving at the duty ratio of 1/400 is realized, and very high contrast and high operating reliability are obtained. In addition, because this embodiment uses a compensation cell formed similarly to the driving cell as an optical compensation element, it properly compensates the retardation difference between various optical wavelengths. Therefore, a display screen is hardly colored and bright black-and-white display with a high contrast is obtained.

The following is a description of concrete examples of this embodiment.

Table 10 shows the structure of an liquid crystal element and the electrooptical characteristic of the element observed from the direction of the normal line of the element on the embodiment in which the liquid crystal element shown in FIG. 19 is formed by using the liquid crystal A having the characteristic shown in Table 8.

In this case, the twist angle of the driving cell 101 and that of the compensation cell 102 are 240° and −240° respectively, the angle $\alpha_1$ of the polarization axis 120a of the polarizing plate 120 and the angle $\beta_1$ of the polarization axis 119a of the polarizing plate 119 are 90° and 180° respectively, and Vth is the operating voltage for obtaining the maximum value of contrast.

As shown in Table 10, the installation angles of polarizing plates 119 and 120 are changed in the examples 6-1 through 6-3. When the installation angles of the polarizing plates 119 and 120 are changed, the contrast ratio changes. At the installation angle of the example 6-1, the contrast ratio reaches 90 which is the maximum value. Therefore, it is preferable that the angle $\alpha_1$ of the polarization axis 120a of the polarizing plate 120 at the driving cell 101 side is 180° and the angle $\beta_1$ of the polarization axis 119a of the polarizing plate 119 at the compensation cell 102 side is 90°. The examples 6-4 and 6-5 show the case in which the value ($\Delta nd_2/\Delta nd_1$) obtained by dividing $\Delta nd_2$ of the compensation cell 102 by $\Delta nd_1$ of the driving cell 101 is changed.

When the value of $\Delta nd_2/\Delta nd_1$ is changed by changing the liquid crystal layer thickness $d_2$ of the compensation cell 102 for the example 6-1, the contrast ratio decreases no matter whether it is larger or smaller than the value of $\Delta nd_2/\Delta nd_1$ (0.95) in the example 6-1. Therefore, it is preferable that the value of $\Delta nd_2/\Delta nd_1$ ranges between 0.92 and 0.97. It is more preferable that the value is kept at 0.95. Examples 6-6 through 6-8 show the case in which the refraction-factor anisotropy $\Delta n$ of a liquid crystal is changed due to temperature. The example 6-6 is manufactured according to the same cell parameter with that of the example 6-1 by using an aligning film whose film quality is different from that of the example 6-1. In this case, the contrast changes when the temperature changes. Therefore, when using the example 6-6 at a high temperature, the contrast can be raised by increasing the value of $\Delta nd$ while keeping the ratio constant. Concretely, when the value is larger than 0.9, compensation of display colors is degraded. Therefore, it is preferable or set the value to 0.9 to less.

For the above embodiment, aligning films 113 and 116 are directly formed on the faced inner surfaces of substrates 111 and 114 of the compensation cell 102. However, it is also possible to use the same structure as that of the driving cell 101 by forming electrodes 112 and 115 orthogonal to each other on the faced inner surfaces of the substrates 111 and 114 similar to the driving cell 101 and forming the aligning films 113 and 116 so that they cover the aligning films 113 and 116.

As described above, this embodiment realizes homogenous stable twist aligning of liquid crystal molecules by increasing the twist angle of the liquid crystal member to 230° to 250°, decreasing the dielectric constant ratio $\Delta\epsilon/\epsilon\perp$ which is the ratio of the dielectric anisotropy $\Delta\epsilon$ to the dielectric constant $\epsilon\perp$ with the direction orthogonal to the liquid crystal molecule axis, and increasing the pre-tilt angle of the liquid crystal molecules between and close to aligning films. Thus, sharp threshold characteristic, high contrast, satisfactory brightness-change sharpness, and high-speed response are obtained and high time-division driving is realized. Especially because the first and second liquid crystal cells in which the same liquid crystal member is sealed are overlapped by reversing the twist direction, the background color of a display screen is achromatic and very high contrast is obtained.

Because the liquid crystal display element having an optical compensation plate in the above embodiment realizes black-and-white display by itself, it is possible to form a color liquid crystal display element by adding a color filter to the liquid crystal display element. In this case, a color filter is used in which three types of color filters corresponding to three primary colors are successively arranged. The color filter element can be arranged inside the facing substrates of the liquid crystal display element or outside of these substrates.

TABLE 1

|  | LC B | LC A | LC X | LC Y | LC Z |
| --- | --- | --- | --- | --- | --- |
| C-N point (°C.) | <−25 | <−40 | <−25 | <−5 | <−5 |
| N-I point (°C.) | 109° C. | 110° C. | 93° C. | 85° C. | 60° C. |
| Viscosity (CP) | 18 CP | 19 CP | 18 CP | 30 CP | 20 CP |
| $\Delta n$ (25° C.) | 0.139 | 0.147 | 0.121 | 0.148 | 0.144 |
| $\Delta\epsilon/\epsilon\perp$ | 1.4 | 1.5 | 1.3 | 2.4 | 1.3 |
| $\bar{\epsilon}$ | 4.5 | 4.9 | 5.2 | greater than 6.0 | — |
| K33/K11 | ≧1.75 | ≧1.75 | <1.75 | <1.75 | <1.75 |

TABLE 2

|  | Example 1-1 | Example 1-2 | Example 2-1 | Example 4-1 | Comparative Example 1 | Comparative Example 2 | Comparative Example 3 | Comparative Example 4 |
| --- | --- | --- | --- | --- | --- | --- | --- | --- |
| LC used | A | A | A | B | X | X | Y | Z |
| Type | STN No Retardation Plates | STN No Retardation Plates | STN One Retardation Plate | STN Two Retardation Plates | STN No Retardation Plate | STN One Retardation Plates | STN Negative | STN Negative |
| Twist Angle | 240° | 240° | 240° | 240° | 240° | 240° | 240° | 90° |
| Pre-tilt | ≧8° | ≧8° | ≧8° | ≧8° | ≧8° | ≧8° | <5° | <3° |
| Layer Thickness | 5.7 μm | 6.0 μm | 5.7 μm | 6.0 μm | 6.7 μm | 6.7 μm | 6.2 μm | 7.0 μm |
| $\Delta n \cdot d$ | 0.84 | 0.84 | 0.84 | 0.84 | 0.81 | 0.81 | 0.92 | 1.0 |
| Duty Ratio | 1/400 | 1/400 | 1/400 | 1/480 | 1/400 | 1/400 | 1/120 | 1/60 |
| Bias Ratio | 1/12 | 1/12 | 1/12 | 1/15 | 1/12 | 1/12 | 1/12 | 1/8.7 |
| Flame Frequency | 70 Hz | 70 Hz | 70 Hz | 70 Hz | 70 Hz | 70 Hz | 60 Hz | 60 Hz |
| Vth [v] | 31.0 | 35.8 | 30.4 | 41.2 | 25.5 | 25.0 | 17.3 | 13.4 |

TABLE 2-continued

| | Example 1-1 | Example 1-2 | Example 2-1 | Example 4-1 | Comparative Example 1 | Comparative Example 2 | Comparative Example 3 | Comparative Example 4 |
|---|---|---|---|---|---|---|---|---|
| Contrast | 44 | 43 | 63 | 50 | 6 | 10 | 10 | 11 |

TABLE 3

| Pre-tilt | LC A | LC X |
|---|---|---|
| 5° | 0 μm | 1.5 μm |
| 8° | 1.8 μm | 3.1 μm |

TABLE 4

| | Example 1-1 | Comparative Example 1 | Comparative Example 3 |
|---|---|---|---|
| LC Used | A | X | Y |
| $\bar{\epsilon}$ | 4.9 | 5.2 | >6.0 |
| Aligning Irregularity | Not observed | Not observed | Observed |

TABLE 5

| Example/Comparative Example | X Coordinate | Y Coordinate |
|---|---|---|
| Example 1-1 | 0.374 | 0.522 |
| Example 2-1 | 0.354 | 0.388 |
| Example 4-1 | 0.326 | 0.402 |
| Comparative Example 1 | 0.350 | 0.529 |
| Comparative Example 2 | 0.369 | 0.389 |
| Paper White | 0.349 | 0.367 |

TABLE 6-1

| | Example 3-1 | Example 3-2 | Example 3-3 | Example 3-4 | Example 3-5 | Example 3-6 | Example 3-7 | Example 3-8 |
|---|---|---|---|---|---|---|---|---|
| Δnd (μm) | 0.75 | ← | ← | ← | ← | ← | ← | ← |
| R (nm) | 580 | ← | ← | ← | ← | ← | ← | ← |
| α (°) | 40 | 30 | 35 | 45 | 50 | 40 | ← | ← |
| β (°) | 110 | ← | ← | ← | ← | ← | ← | ← |
| γ (°) | 75 | ← | ← | ← | ← | ← | ← | ← |
| Y Coordinate | 0.376 | 0.399 | 0.385 | 0.368 | 0.356 | 0.392 | 0.379 | 0.381 |
| X Coordinate | 0.407 | 0.399 | 0.403 | 0.416 | 0.415 | 0.411 | 0.417 | 0.405 |

TABLE 6-2

| | Example 3-9 | Example 3-10 | Example 3-11 | Example 3-12 | Example 3-13 | Example 3-14 | Example 3-15 | Example 3-16 |
|---|---|---|---|---|---|---|---|---|
| Δnd (μm) | 0.75 | ← | ← | ← | ← | ← | ← | ← |
| R (nm) | 580 | ← | ← | ← | ← | ← | ← | ← |
| α (°) | 40 | ← | ← | ← | ← | 50 | 45 | 40 |
| β (°) | 110 | 100 | 105 | 115 | 120 | 100 | 110 | ← |
| γ (°) | 85 | 75 | ← | ← | ← | 75 | 90 | 75 |
| Y Coordinate | 0.368 | 0.353 | 0.364 | 0.379 | 0.381 | 0.306 | 0.330 | 0.370 |
| X Coordinate | 0.421 | 0.404 | 0.406 | 0.406 | 0.400 | 0.385 | 0.437 | 0.404 |

TABLE 6-3

| | Example 3-17 | Example 3-18 | Example 3-19 | Example 3-20 | Example 3-21 | Example 3-22 | Example 3-23 |
|---|---|---|---|---|---|---|---|
| Δnd (μm) | 0.75 | ← | ← | ← | ← | ← | ← |
| R (nm) | 580 | ← | ← | ← | ← | ← | ← |
| α (°) | 50 | 45 | 50 | 55 | 60 | 55 | ← |
| β (°) | 95 | 110 | 100 | ← | 105 | ← | 110 |
| γ (°) | 90 | 75 | 90 | ← | ← | ← | ← |
| Y Coordinate | 0.312 | 0.362 | 0.325 | 0.307 | 0.311 | 0.320 | 0.345 |
| X Coordinate | 0.431 | 0.410 | 0.446 | 0.444 | 0.456 | 0.448 | 0.467 |

TABLE 6-4

| | Example 3-24 | Example 3-25 | Example 3-26 | Example 3-27 | Example 3-28 |
|---|---|---|---|---|---|
| Δnd (μm) | 0.85 | 0.80 | 0.75 | 0.83 | 0.88 |
| R (nm) | 600 | ← | 580 | 600 | ← |
| α (°) | 35 | ← | ← | 40 | 50 |
| β (°) | 105 | ← | ← | ← | ← |
| γ (°) | 80 | ← | ← | ← | 90 |
| Y Coordinate | 0.366 | 0.366 | 0.346 | 0.357 | 0.396 |
| X Coordinate | 0.372 | 0.375 | 0.366 | 0.384 | 0.440 |

TABLE 7

| | Example 4-2 | Example 4-3 | Example 4-4 | Example 4-5 |
|---|---|---|---|---|
| LC | LC B | LC B | LC B | LC B |
| Δn · d (μm) | 0.84 | 0.84 | 0.84 | 0.84 |
| R1 (nm) | 360 | 360 | 360 | 360 |
| R2 (nm) | 360 | 360 | 360 | 360 |
| α (°) | 15 | 15 | 15 | 20 |
| β (°) | 105 | 100 | 105 | 105 |
| γ (°) | 55 | 55 | 55 | 55 |
| δ (°) | 90 | 90 | 95 | 90 |
| Vth (v) | 42.0 | 41.8 | 41.4 | 42.0 |
| Contrast | >50 | >56 | >45 | >40 |
| CIE (x, y) | (0.316, 0.394) | (0.312, 0.319) | (0.335, 9.404) | (0.326, 0.403) |

TABLE 8

| | LC C |
|---|---|
| Melting point | −35° C. |
| N-I Point | 96° C. |
| Viscosity | 20 (CP) |
| $\Delta n$ | 0.148 |
| $\Delta\epsilon/\epsilon\perp$ | 1.4 |
| $\bar{\epsilon}$ | 5.8 |

TABLE 9

| | Example 5-1 | Example 5-2 | Example 5-3 | Example 5-4 |
|---|---|---|---|---|
| Twist Angle | 240° | 240° | 240° | 240° |
| Pretilt | ≧8 | ≧8 | ≧8 | ≧8 |
| Layer Thickness | 5.7 | 5.7 | 5.7 | 5.7 |
| $\Delta n \cdot d$ | 0.84 | 0.84 | 0.84 | 0.84 |
| d/p | 0.50 | 0.56 | 0.50 | 0.56 |
| Duty Ratio | 1/400 | 1/400 | 1/400 | 1/400 |
| Bias Ratio | 1/12 | 1/12 | 1/12 | 1/12 |
| Frame Frequency | 70 Hz | 70 Hz | 70 Hz | 70 Hz |
| Vth (V) | 30.0 | 31.9 | 29.3 | 31.0 |
| Contrast Ratio | 60.0 | 4.8 | 36 | 22 |
| Response Time (msec) | 320 | 250 | 300 | 250 |

TABLE 10

| | Example 6-1 | Example 6-2 | Example 6-3 | Example 6-4 | Example 6-5 | Example 6-6 | Example 6-7 | Example 6-8 |
|---|---|---|---|---|---|---|---|---|
| Pre-tilt | ≧8 | ≧8 | ≧8 | ≧8 | ≧8 | ≧8 | ≧8 | ≧8 |
| LC Layer Thickness of Driven Cell ($d_1$) | 5.3 μm | 5.3 μm | 5.3 μm | 5.3 μm | 5.3 μm | 5.3 μm | 5.3 μm | 5.8 μm |
| LC Layer thickness of Compensation Cell ($d_2$) | 5.0 μm | 5.0 μm | 5.0 μm | 4.9 μm | 5.2 μm | 5.0 μm | 5.0 μm | 5.5 μm |
| $\Delta n \cdot d_1$ | 0.78 | 0.78 | 0.78 | 0.78 | 0.78 | 0.78 | 0.78 | 0.85 |
| $\Delta n \cdot d_2$ | 0.74 | 0.74 | 0.74 | 0.72 | 0.76 | 0.74 | 0.74 | 0.81 |
| $\Delta n d_1/\Delta n d_2$ | 0.95 | 0.95 | 0.95 | 0.92 | 0.97 | 0.95 | 0.95 | 0.95 |
| Angle of Polarizing Plate of Driven Cell $\alpha_1$ | 180 | 190 | 170 | 180 | 180 | 180 | 180 | 180 |
| Angle of Polarizing Plate of Compensation Cell $\beta_1$ | 90 | 100 | 80 | 90 | 90 | 90 | 90 | 90 |
| Temperature (C.°) | 25 | 25 | 25 | 25 | 25 | 25 | 40 | 40 |
| Vth (V) | 35.7 | 35.7 | 35.8 | 36.1 | 35.2 | 37.4 | 36.1 | 35.7 |
| Contrast Ratio | 90 | 87 | 89 | 60 | 64 | 73 | 34 | 60 |

What is claimed is:

1. A liquid crystal display device comprising:
   a pair of substrates having respective inner surfaces facing each other;
   first and second electrodes formed on facing inner surfaces of said pair of substrates, said first and second electrodes being arranged so that they are crossed and face each other;
   first and second aligning films covering each inner surface of said pair of substrates and covering said first and second electrodes, said first and second aligning films being provided with an aligning treatment in a certain direction respectively;
   a liquid crystal layer sealed between said pair of substrates by a seal member, said liquid crystal layer being twistingly aligned at an angle of about 230° to 250° by the aligning force of said first and second aligning films, and said liquid crystal layer having a dielectric constant ratio $\Delta\epsilon/\epsilon\perp$ defined as a ratio of a dielectric anisotropy to a dielectric constant $\Delta\epsilon$ in a direction orthogonal to a liquid crystal molecule axis of 1.5 or less, an elastic constant ratio $K_{33}/K_{11}$ defined as a ratio of a bent elastic constant $K_{33}$ to a splay elastic constant $K_{11}$ of 1.75 or more, an average dielectric constant $\bar{\epsilon}$ defined by an expression $\bar{\epsilon}=(\epsilon||+2\epsilon\perp)/3$ of 6 or less, and a positive dielectric anisotropy; and
   a pair of polarizing plates arranged to sandwich said pair of substrates therebetween.

2. A liquid crystal display device according to claim 1, wherein said first and second aligning films are made of a macromolecular film whose surface is provided with an aligning treatment to align liquid crystal molecules adjacent to said first and second aligning films at a pre-tilt angle of 6° or more from the aligning film surface; and
   said liquid crystal layer is made of a liquid crystal member in which the liquid crystal molecules adjacent to said films are arranged by said aligning films at the pre-tilt angle of 6° or more.

3. A liquid crystal display device according to claim 1, further comprising:
   an optical compensation element for compensating retardation differences between transmitted-beams wavelengths arranged between said first and second polarizing plates.

4. A liquid crystal display device according to claim 3, wherein said optical compensation element includes at least one retardation plate.

5. A liquid crystal display device according to claim 1, further comprising a reflector installed outside one of said pair of substrates.

6. A liquid crystal display device comprising:
   a pair of substrates having respective inner surfaces facing each other;
   first and second electrodes formed on facing inner surfaces of said pair of substrates, said first and second electrodes being arranged so that they are crossed and face each other;
   first and second aligning films covering each inner surface of said pair of substrates and covering said first and second electrodes, said first and second aligning films including a macromolecular film for arranging liquid crystal molecules at a pre-tilt angle of 6° or more from the aligning film surface, and said first and second aligning films being provided with an aligning treatment in a certain direction respectively;

a liquid crystal layer including a liquid crystal member sealed between said pair of substrates by a seal member, wherein liquid crystal molecules adjacent to the aligning films are arranged at said pre-tilt angle of 6° or more from said aligning film surface by the aligning force of said first and second aligning films and twistingly aligned at an angle of about 230° to 250° in a direction from said first aligning film to said second aligning film, and having a dielectric constant ratio of $\Delta\epsilon/\epsilon\perp$ defined as a ratio of a dielectric anisotropy $\Delta\epsilon$ to a dielectric constant $\epsilon\perp$ in a direction orthogonal to a liquid crystal molecule axis of 1.5 or less, an elastic constant ratio $K_{33}/K_{11}$ defined as a ratio of a bent elastic constant $K_{33}$ to a splay elastic constant $K_{11}$ of 1.75 or more, a vertical component of the dielectric constant of 4 or less, and a positive dielectric anisotropy; and a pair of polarizing plates arranged to sandwich said pair of substrates therebetween.

7. A liquid crystal display device according to claim 6, wherein said liquid crystal member has an average dielectric constant $\bar{\epsilon}$ defined by an expression $\bar{\epsilon}=(\epsilon\|+2\epsilon\perp)/3$ of 6 or less.

8. A liquid crystal display device according to claim 6, wherein said liquid crystal member includes an optically active substance, and said liquid crystal member forms a liquid crystal layer with a layer thickness d between said aligning films and has a liquid crystal layer thickness d and a natural pitch P such that a value d/p is 0.55 or more.

9. A liquid crystal display device according to claim 8, wherein said liquid crystal member has an average dielectric constant $\bar{\epsilon}$ defined by an expression $\bar{\epsilon}=(\epsilon\|+2\epsilon\perp)/3$ of 6 or less.

10. A liquid crystal display device according to claim 6, further comprising:

an optical compensation element for compensating retardation differences between transmitted-beams wavelengths arranged between said first and second polarizing plates.

11. A liquid crystal display device according to claim 10, wherein said optical compensation element includes at least one retardation plate.

12. A liquid crystal display device according to claim 10, wherein said optical compensation element comprises:

a pair of compensation cell substrates facing each other;

third and fourth aligning films covering each inner surface of said compensation cell substrates and provided with an aligning treatment in a certain direction respectively; and a compensating liquid crystal layer sealed between said compensation cell substrates by a seal member and twistingly aligned by an aligning force of said third and fourth aligning films in a direction opposite to the twist direction of the liquid crystal molecules of said liquid crystal layer at an angle approximately equal to the twist angle of the liquid crystal molecule arrangement of said liquid crystal layer.

13. A liquid crystal display device comprising:

a pair of substrates having respective inner surfaces facing each other;

first and second electrodes formed on facing inner surfaces of said pair of substrates, said first and second electrodes being arranged so that they are crossed and face each other;

first and second aligning films covering each inner surface of said pair of substrates and covering said first and second electrodes, said first and second aligning films including a macromolecular film for arranging liquid crystal molecules at a pre-tilt angle of 6° or more from the aligning film surface, and said first and second aligning films being provided with an aligning treatment in a certain direction respectively;

a liquid crystal layer including a liquid crystal member sealed between said pair of substrates by a seal member, wherein liquid crystal molecules adjacent to the aligning films are arranged at said pre-tilt angle of 6° or more from said aligning film surface by the aligning force of said first and second aligning films and twistingly aligned at an angle of about 230° to 250° in a direction from said first aligning film to said second aligning film, and having a dielectric constant ratio of $\Delta\epsilon/\epsilon\perp$ defined as a ratio of a dielectric anisotropy $\Delta\epsilon$ to a dielectric constant $\epsilon\perp$ in a direction orthogonal to a liquid crystal molecule axis of 1.5 or less, an elastic constant ratio $K_{33}/K_{11}$ defined as a ratio of a bent elastic constant $K_{33}$ to a splay elastic constant $K_{11}$ of 1.75 or more, a vertical component of the dielectric constant of 4 or less, and a positive dielectric anisotropy; and a pair of polarizing plates arranged to sandwich said pair of substrates therebetween; and wherein at least one of said first and second aligning films includes a macromolecular film having a surface-energy polarity force of component $\gamma p$ of more than 40 dyn/cm.

* * * * *